US008317087B1

(12) United States Patent
Crews et al.

(10) Patent No.: US 8,317,087 B1

(45) Date of Patent: Nov. 27, 2012

(54) AUTOMATED BANKING SYSTEM CONTROLLED RESPONSIVE TO DATA BEARING RECORDS

(75) Inventors: Tim Crews, Alliance, OH (US); Natarajan Ramachandran, Uniontown, OH (US)

(73) Assignee: Diebold Self-Service Systems, North Canton, OH (US)

(*) Notice: Subject to any disclaimer, the term of this patent is extended or adjusted under 35 U.S.C. 154(b) by 1267 days.

(21) Appl. No.: 12/075,460

(22) Filed: Mar. 11, 2008

Related U.S. Application Data

(60) Provisional application No. 60/920,190, filed on Mar. 27, 2007, provisional application No. 60/920,174, filed on Mar. 27, 2007.

(51) Int. Cl.

| | |
|---|---|
| ***G07F 19/00*** | (2006.01) |
| ***G06Q 40/00*** | (2006.01) |
| ***G07D 11/00*** | (2006.01) |
| ***G06F 13/00*** | (2006.01) |
| ***G06F 13/28*** | (2006.01) |

(52) U.S. Cl. ......... 235/379; 711/162; 711/163; 711/164

(58) Field of Classification Search .................. 235/379; 705/39, 43; 711/162–164

See application file for complete search history.

(56) References Cited

U.S. PATENT DOCUMENTS

| | | | | |
|---|---|---|---|---|
| 5,188,301 | A * | 2/1993 | Hasegawa | 241/33 |
| 5,790,028 | A * | 8/1998 | Lee | 340/571 |
| 5,940,844 | A * | 8/1999 | Cahill et al. | 715/268 |
| 5,952,920 | A * | 9/1999 | Braddick | 340/568.1 |
| 6,679,422 | B2 * | 1/2004 | Brown et al. | 235/379 |
| 6,839,083 | B2 * | 1/2005 | Hamamoto et al. | 348/150 |
| 2005/0094564 | A1 * | 5/2005 | Huang | 370/236 |
| 2006/0028341 | A1 * | 2/2006 | Bartholf et al. | 340/570 |
| 2006/0279152 | A1 * | 12/2006 | Ha | 310/114 |

FOREIGN PATENT DOCUMENTS

| | | | |
|---|---|---|---|
| JP | 2000093224 | A * | 4/2000 |
| JP | 2001084465 | A * | 3/2001 |

* cited by examiner

*Primary Examiner* — Steven S Paik

*Assistant Examiner* — Toan Ly

(74) *Attorney, Agent, or Firm* — Ralph E. Jocke; Daniels D. Wasil; Walker & Jocke

(57) ABSTRACT

An automatic banking machine includes a card reader for reading user cards, and a cash dispenser. The automated banking machine carries out banking transactions related to user accounts based on information read from cards. The automated banking machine provides a printed receipt for transactions conducted. The machine carries out transactions when operatively connected to a source of AC power and a transaction network. The machine also carries out certain exception instructions when disconnected from its power source and/or network connection.

9 Claims, 11 Drawing Sheets

AUTOMATED BANKING SYSTEM CONTROLLED RESPONSIVE TO DATA BEARING RECORDS

CROSS REFERENCE TO RELATED APPLICATIONS

This application claims benefit pursuant to 35 U.S.C. §119 (e) of Provisional Application Ser. Nos. 60/920,190 and 60/920,174 filed Mar. 27, 2007, the disclosures of each of which are incorporated herein by reference.

TECHNICAL FIELD

This invention relates to banking systems controlled by data bearing records that may be classified in U.S. Class 235, Subclass 379. Exemplary embodiments relate to automated banking machines and methods that provide improved machine reliability, serviceability and theft deterrence.

BACKGROUND ART

Automated banking machines may include a card reader that operates to read data from a bearer record such as a user card. The automated banking machine may operate to cause the data read from the card to be compared with other computer stored data related to the bearer. The machine operates in response to the comparison determining that the bearer is an authorized system user to carry out at least one transaction which is operative to transfer value to or from at least one account. A record of the transaction is also commonly printed through operation of the automated banking machine and provided to the user. A common type of automated banking machine used by consumers is an automated teller machine ("ATM"). ATMs read customer cards and enable customers to carry out banking transactions. Banking transactions carried out using ATMs may include the dispensing of cash, the making of deposits, the transfer of funds between account and account balance inquiries. The types of banking transactions a customer can carry out are determined by the capabilities of the particular banking machine and the programming of the institution operating the machine.

Other types of automated banking machines may be operated by merchants to carry out commercial transactions. These transactions may include, for example, the acceptance of deposit bags, the receipt of checks or other financial instruments, the dispensing of rolled coin or other transactions required by merchants. Still other types of automated banking machines may be used by service providers in a transaction environment such as at a bank to carry out financial transactions. Such transactions may include for example, the counting and storage of currency notes or other financial instrument sheets, the dispensing of notes or other sheets, the imaging of checks or other financial instruments, and other types of service provider transactions. For purposes of this disclosure an automated banking machine or an ATM shall be deemed to include any machine that may be used to automatically carry out transactions involving transfers of value.

Automated banking machines may benefit from improvements.

OBJECTS OF EXEMPLARY EMBODIMENTS

It is an object of exemplary embodiments to provide an improved automated banking machine.

It is another object of exemplary embodiments to provide an automated banking machine having improved servicing capabilities.

It is a further object of exemplary embodiments to provide an automated banking machine including a movable image capture device to enable enhanced servicing capabilities.

It is a further object of exemplary embodiments to provide an automated banking machine able to generate visual images with an image capture device for diagnostic purposes.

It is a further object of exemplary embodiments to provide an automated banking machine having a serviceable component able to be indirectly viewed by service personnel through use of a movable image capture device.

It is a further object of exemplary embodiments to provide an automated banking machine able to communicate data corresponding to visual images captured by a movable image capture device, to a display at the machine and/or to a remote location.

It is a further object of exemplary embodiments to provide an automated banking machine able to generate visual and/or sonic diagnostic information related to serviceable components of the machine.

It is a further object of exemplary embodiments to provide an automated banking machine including a user interface, a service display disposed from the user interface, and an image capture device, wherein the service display is able to display data and visual images corresponding to a serviceable component in the machine and/or objects in the vicinity of the machine.

It is a further object of exemplary embodiments to provide a method of servicing an automated banking machine including generating visual image data with a movable image capture device and displaying visual images of a serviceable component on a display screen at the machine location and/or one or more remote locations.

It is a further object of exemplary embodiments to provide an automated banking machine that deters the theft thereof.

It is a further object of exemplary embodiments to provide an automated banking machine that can carry out certain computer executable instructions when the machine has been disconnected from its power source and/or network connections.

Further objects of exemplary embodiments will be made apparent in the following Detailed Description of Exemplary Embodiments and the appended claims.

The foregoing objects are accomplished in one exemplary embodiment by an apparatus including a cash dispensing automated banking machine that includes a visual display, at least one serviceable component, and a controller. For purposes of this disclosure a controller shall be construed as a processor that executes program instructions. The apparatus also includes a movable image capture device such as a camera in operative connection with the controller, which can be selectively positioned toward and away from the serviceable component. The movable image capture device may be connected to the controller through a universal serial bus (USB) connection. The connection cable may have sufficient length and flexibility to enable the image capture device to be moved to place in its field of view, regions within and outside the machine housing. Visual images generated by the image capture device can be output on the visual display. Thus, regions of the serviceable component that cannot be directly viewed by a servicer by looking into the interior of the machine may be indirectly viewed by a servicer. Exemplary banking machines may include additional image capture devices mounted in fixed or movable relationship relative the banking machine housing which are able to provide visual images of areas in or around the machine.

The exemplary apparatus may include a microphone that can pick up sounds which may correspond to diagnostic information related to a transaction function device. The sonic information may be output to a service provider through speakers located at the rear of the banking machine, through headphones, or be communicated by the machine to a remote location. A microphone may also be used in some embodiments to pick up sounds in front of or near the banking machine to alert a service provider that a potential customer is approaching. In some embodiments a microphone may be attached to the image capture device, so that image data and sonic data may be simultaneously generated. Additionally in some embodiments, a radiation source may be attached to the image capture device to illuminate areas of interest and enhance the visual images. Alternately, or in addition, one or more radiation sources may be housed within the housing of the banking machine to illuminate areas of interest.

In some embodiments one or more transaction function devices may be mounted on a rollout tray that is movable between a retracted position within the banking machine housing and an extended position. In the extended position the rollout tray extends through an opening in the machine housing so that the machine components are more readily accessible for servicing. The movable image capture device may be used to capture visual images of components carried on the rollout tray, or other components that may be accessed when the tray is in the extended position.

Diagnostic information, such as the generated visual images and/or sonic information, concerning one or more transaction function devices, may be stored in one or more data stores in operative connection with one or more machine controllers. A service provider may be permitted to access the diagnostic information by placing a diagnostic article, such as a CD, in engagement with a diagnostic article reading device on the machine. Information about the transaction function devices and data generated by image capture devices may be stored on-site in the machine, stored on the diagnostic article, or may be communicated to a remote computer.

Some exemplary banking machines may be equipped with a service display primarily used for service and diagnostic purposes. This service display may be a separate display from the customer display that provides outputs to machine users conducting cash dispensing and other transactions. In some embodiments the service display may be movable relative the machine housing. In some embodiments the housing may include an opening through which the service display may be extended when a service provider is engaged in a service activity. In some embodiments the housing may include a wall surface that includes a transparent window. The service display may be positioned within the housing and have its outputs be visible through the window. Alternately or in addition, a display in operative connection with a remote computer may be utilized for service and diagnostic purposes. Visual images, sonic information, device status information and/or diagnostic information may be communicated to the remote computer through a communications network. The remote computer may be used to analyze such information for service purposes.

An exemplary automated banking machine includes a display, a card reader, a cash dispenser, at least one camera connection port adapted to accept signals from a movable camera and at least one controller. The controller is operative to send image data corresponding to a visual image within a field of view of a movable camera in connection with the camera connection port, from the banking machine to at least one remote computer.

An exemplary automated banking machine is selectively operable in an operational mode and a service mode. The mode may be selected by a servicer providing one or more inputs through an input device. The exemplary banking machine includes at least one serviceable component including a currency dispenser. A user interface disposed at the front of the housing includes at least one input device to receive inputs from machine users and a display screen to provide outputs to machine users. At least one controller is in operative connection with the serviceable component such that the controller is able to provide status data relating to the serviceable component. The banking machine also includes at least one image capture device such as a camera that is able to generate data corresponding to visual images depicting objects within a predetermined vicinity of the banking machine. The exemplary banking machine also includes a service display disposed away from the user interface. The service display is in operative connection with the controller and the image capture device such that the service display is operative to output indicia corresponding to the status data and the visual images.

An exemplary method includes generating data corresponding to a visual image of a region of at least one serviceable component of a cash dispensing automated banking machine through operation of a first image capture device. The first image capture device can be moved so as to be directed toward the region of interest. The visual image of the region is displayed on a first display screen in supporting connection with the automated banking machine. In exemplary embodiments, the data corresponding to the visual image may be transmitted from the banking machine to at least one remote computer.

An exemplary method includes generating with an image capture device, data corresponding to visual images of objects within the vicinity of a user interface of an automated banking machine, not directly viewable by a servicer of the banking machine, and displaying the visual images on a service display which is viewable by the servicer while performing a service activity. In some embodiments the visual images may show the presence and absence of a potential machine user. The exemplary method also includes displaying indicia corresponding to status data relating to at least one serviceable component on the service display, which display may be provided simultaneously with the visual images.

An exemplary method includes receiving at least one input through at least one input device of a first user interface of a cash dispensing automated banking machine. Responsive to the at least one input, the banking machine is operated to provide at least one of video and audio communication between the first user interface and a second user interface on the machine, the second user interface being disposed on the machine from the first user interface.

A further exemplary method includes providing at least one first input through an input device of a first user interface of a cash dispensing automated banking machine. The at least one first input is operative to cause the machine to provide at least one of video and audio communications between respective users at the first user interface and second user interface on the banking machine. At least one of the visual and audible information is communicated between a first servicer adjacent the first user interface and providing the at least one first input, and a second servicer located adjacent the second user interface.

In further exemplary embodiments the automated banking machine includes a controller with a processor that operates to carry out instructions in a first data store when the machine is in normal operation. These instructions include ATM application instructions that are operative to cause the banking machine to carry out transactions. The exemplary embodiment further includes a further data store in operative connection with the at least one processor. This further data store includes exception instructions. The exception instructions are executed by the at least one processor in an out-of-band environment such as for example when the ATM has been disconnected from its normal power source and/or network connection. The exception instructions may be operative for example, in circumstances that suggest that the banking machine has been taken by thieves and is being moved from its original location for purposes of accessing the interior thereof. The at least one processor may operate in response to limited auxiliary power from a source within the machine such as a battery. Exception instructions may cause the machine to carry out activities that are designed to inform personnel of the theft and/or deter such theft activities. This may include for example, sending wireless signals. These wireless signals may include signals that identify the banking machine and its current geographic position. For example the signals may include global positioning system (GPS) signals that indicate the current location of the ATM. In some exemplary embodiments the wireless signals output by the machine may also include data indicative of the status of devices on the machine, such as whether the chest door of the machine which prevents access to valuable items is closed or open, the status of cassettes which hold valuables, and/or the status of other sensors or devices in the machine. In still other embodiments the wireless signals may include image data generated by imaging devices such as a camera. Of course these approaches are exemplary.

In still other embodiments the banking may include a wireless receiving device. The receiving device may receive wireless signals from a remote source such as an entity monitoring the ATM. Such received signals may cause the execution of certain exception instructions. Such received signals may also cause the output of status data regarding the status of devices and/or the output of wireless signals including image data.

In some embodiments the exception instructions executed in response to received signals may include the operation of a cash destruction device. For purposes of this disclosure a cash destruction device shall be deemed to include any device that provides for the destruction or any change in condition that renders unusable, cash or other valuable items, including stored data, within the machine. Cash destruction devices may include in some embodiments, a system which stains currency or other valuables within the machine. In other embodiments the cash destruction device may include devices that output a pungent odor that ruins cash or other items in the machine. In still other embodiments the cash destruction device may include a combustion initiator that incinerates items within the machine. In still further embodiments the cash destruction device may include a sheet cutter mechanism that operates to destroy valuable sheets by cutting or tearing action. Of course these cash destruction devices are exemplary of types of devices that may be used.

In still other embodiments exception instructions executed responsive to received signals may include operation of attack devices within the machine. Such attack devices may include for example, human disabling devices such as devices that emit chemicals. Such chemicals may include tear gas, pepper spray or other suitable items that disable a person exposed to the chemical.

In still other embodiments the attack devices may include electric shock devices. Such devices may operate to temporarily stun a criminal and/or incapacitate them for a period of time. In still other embodiments the attack devices may include a sonic output device that is operative to output sonic signals that cause pain to persons in proximity to the machine. Of course it should be understood that these attack devices are exemplary and in other embodiments other devices may be used.

Exemplary embodiments may use various combinations of sensing devices, cash destruction devices and attack devices so as to minimize the risk of criminals achieving a successful attack. Such capabilities may serve as a deterrent to such attacks, thus reducing thefts.

In still other embodiments the exception instructions which may be executed in an out-of-band environment may operate to provide other capabilities for the automated banking machine. These may include diagnostic capabilities as well as recovery capabilities from malfunctions or other problems that arise. Of course these approaches are exemplary.

DETAILED DESCRIPTION OF EXEMPLARY EMBODIMENTS

Figure 1:
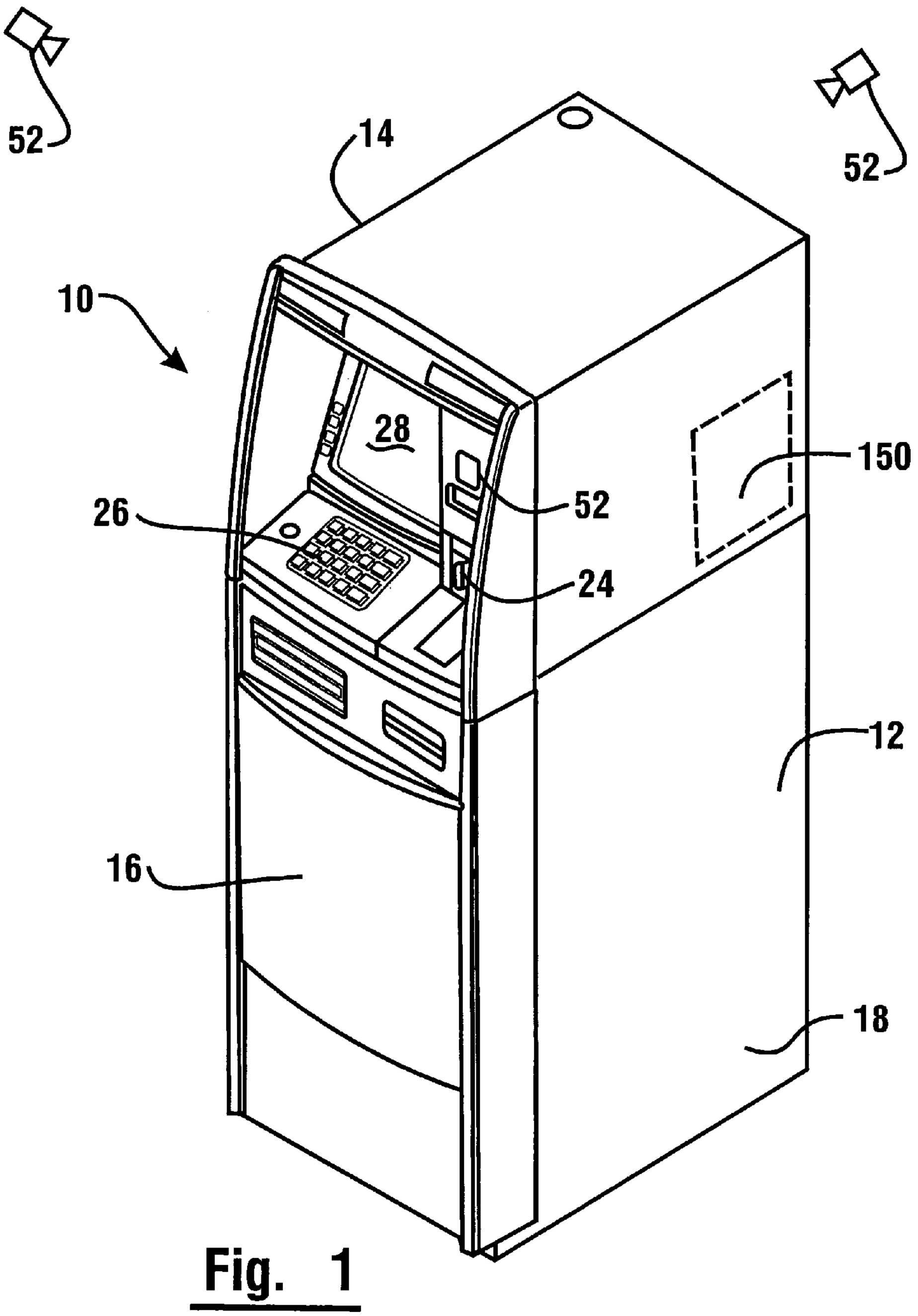
FIG. 1 is a schematic representation of an exemplary automatic banking machine.

Referring now to the drawings and particularly to FIG. 1 there is shown therein an exemplary embodiment of an automated banking machine that operates using information read from user cards generally indicated 10. In the exemplary embodiment automated banking machine 10 is an ATM, however the features described and claimed herein are not limited to any particular type of automated banking machine. The exemplary ATM includes a housing 12. In the embodiment shown, housing 12 includes an upper housing area 14 and a lower housing area 16 including a secure chest portion 18. Access to an interior area of the chest portion 18 is controlled by a chest door 20 (see FIG. 2) which when unlocked by authorized persons, enables gaining access to the interior area 22 of the chest area. In an exemplary embodiment, access to the upper housing area 14 may be made through an appropriate opening in the housing 12. The opening to the interior area of the upper housing portion may also be controlled by a movable door. In exemplary embodiments, the opening may be in a front, rear or side of the housing. In other embodiments, the housing may include several openings to the interior area. In an exemplary embodiment, the chest door 18 may be situated at the front of the housing, for so called "front-load" ATMs or at the rear of the housing for "rear-load" ATMs. Examples of ATM housing structures are shown in U.S. Pat. Nos. 7,156,296; 7,156,297; 7,165,767; and 7,004,384 the disclosures of which are incorporated herein by reference.

An exemplary embodiment includes devices and methods operable as a video and audio system to support service personnel in servicing an ATM, as explained in further detail below. In an exemplary embodiment, the ATM 10 includes a number of transaction function devices that must be serviced from time to time. These transaction function devices are associated with components of the machine such as a card reader 24 and a keypad 26. The card reader and keypad serve as input devices through which users can input instructions and information. It should be understood that as referred to herein the keypad may include function keys or touch screen areas which may be used in embodiments to input data into the machine. ATM 10 further includes a visual display 28 generally operative as an output device to provide information to users of the machine. The information provided may include information concerning cash dispensing transactions. The card reader is used to read data from user cards that can be used to identify customer financial accounts to the machine. In some embodiments the card reader may be a magnetic stripe type reader. In other embodiments the card reader may be a smart card reader, or a contactless reader such as a radio frequency identification (RFID) reader.

Figure 2:
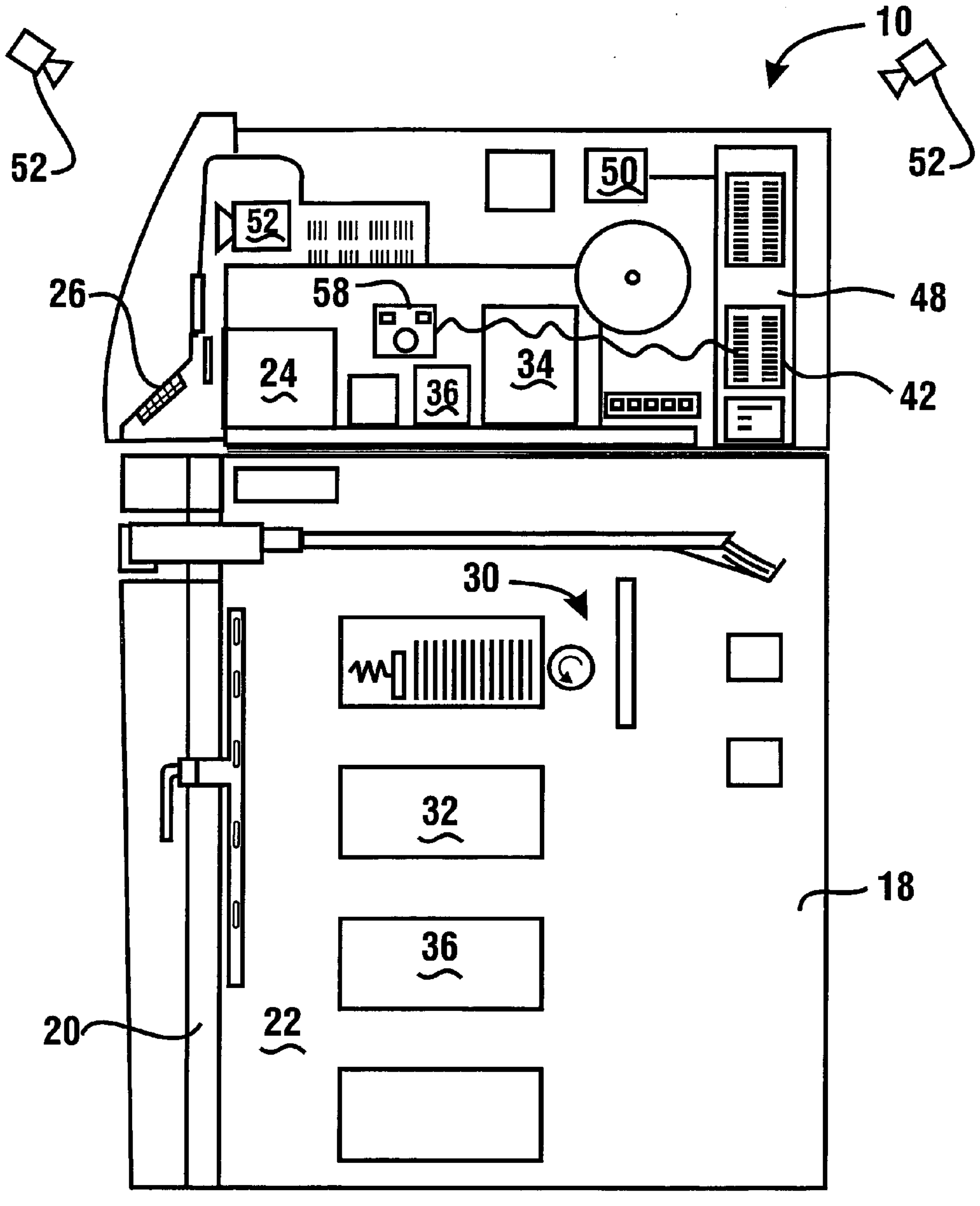
FIG. 2 is a schematic side view of the exemplary automatic banking machine of FIG. 1.

FIG. 2 shows a schematic view of an exemplary hardware configuration of an exemplary ATM. ATM 10 includes additional transaction function devices. Such transaction function devices may include a document dispensing mechanism, including a dispenser, schematically indicated 30, which operates to obtain sheets such as currency bills or other documents of value from within the machine and to deliver them to a customer. Such mechanisms are referred to herein as a cash dispenser. Examples of such cash dispensers are shown in U.S. Pat. Nos. 7,121,461; 7,131,576; 7,140,537; 7,140,607; 7,144,006; and 7,000,832 the disclosures of which are incorporated herein by reference.

The exemplary ATM 10 further includes a depository 32. The depository 32 accepts deposits such as cash or other instruments such as checks from customers. It should be understood that in other embodiments other types of depositories which accept various types of items representative of value may be used. Examples of depository devices are shown in U.S. Pat. Nos. 7,156,295; 7,137,551; 7,150,394; and 7,021,529 the disclosures of which are incorporated hereby by reference. The exemplary embodiment may include a printer 34 operative to print customer receipts related to the transaction. The exemplary embodiment may include other transaction function devices, such as a coin dispenser, cash acceptor, currency stacker, ticket accepting devices, stamp accepting devices, card dispensing devices, money order dispensing devices, and other types of devices which are operative to carry out transaction functions. Some of these devices may be located in the upper or lower housing areas, all generally schematically represented as 36. It should be understood that the embodiment shown is merely illustrative and automated banking machines of various embodiments may include a variety of transaction function devices and component configurations.

Figure 3:
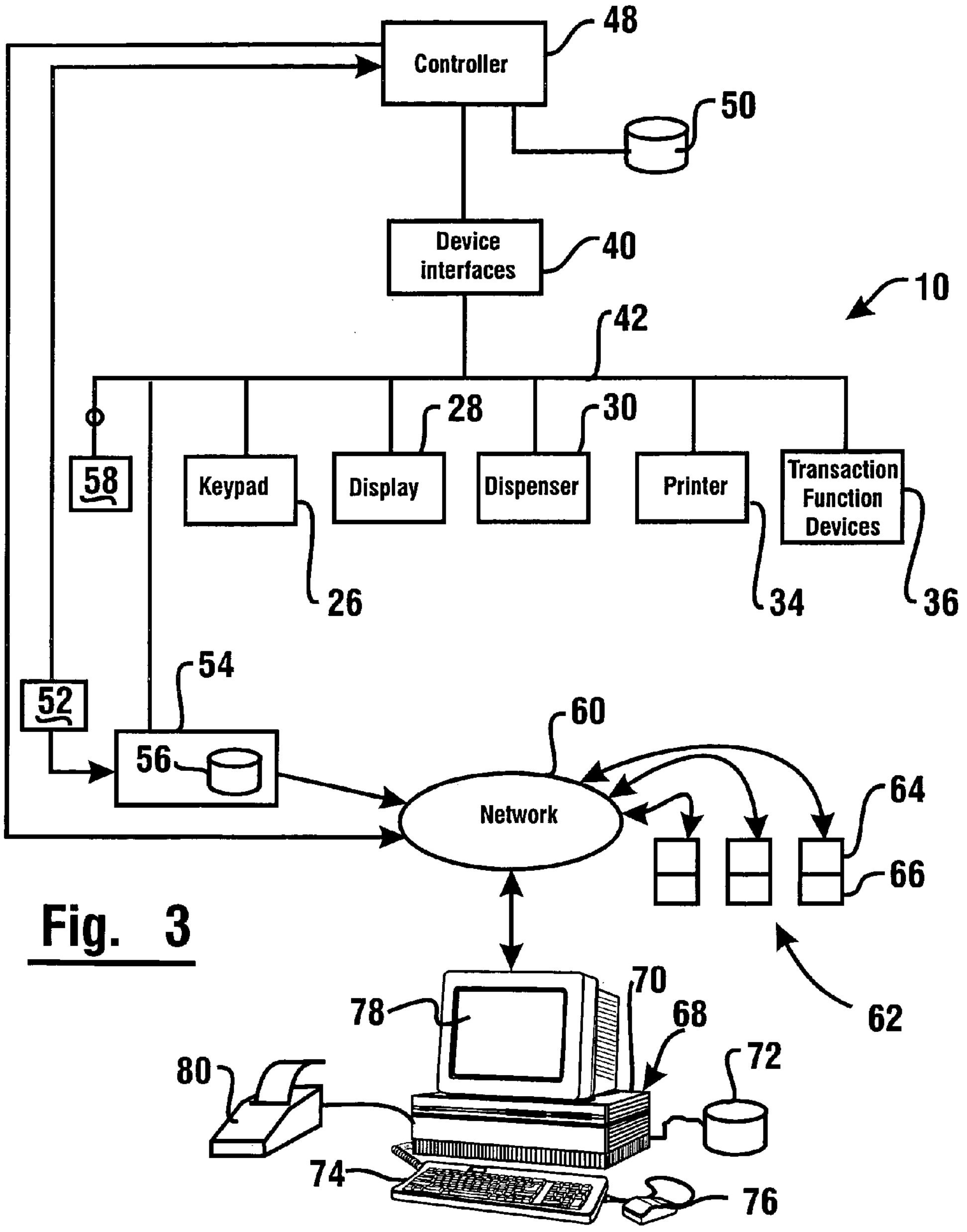
FIG. 3 is a schematic view of a control system for devices within an automatic banking machine.

In an exemplary embodiment, one or more of the transaction function devices, i.e., keypad 26, display 28, dispenser 30, printer 34, or other devices 36 communicate through and are operated responsive to signals passed through device interfaces schematically represented as 40 (see FIG. 3). The device interfaces communicate with the transaction function devices on an interface bus 42 which in exemplary embodiments may be a universal serial bus (USB). The messages which control operation of the various transaction function devices are communicated through the interface bus 42. At least one computer which is also referred to as a terminal controller 48 operates the ATM by communicating messages to the device interfaces to control the transaction function devices.

For purposes of simplicity, the exemplary embodiment will be described as having a single controller 48 which controls the operation of devices within the machine. However, it should be understood that such reference shall be construed to encompass multicontroller and multiprocessor systems as may be appropriate in controlling the operation of a particular machine. For example some embodiments may operate using principles described in U.S. Pat. No. 6,264,101 or 6,131,809 the disclosures of which are incorporated herein by reference. As schematically represented, the controller 48 is in operative connection with one or more data stores 50. Such data stores may include for example, articles bearing computer executable instructions such as hard drives, flash memory, firmware or other data storage devices. Such data stores 50 in exemplary embodiments are operative to store computer executable program instructions, values and other information used in the operation of the machine.

With reference to FIGS. 1 and 2, the exemplary embodiment may further include image capture devices such as cameras 52 which provide camera signals representative of what is observed within the field of view of the respective camera. The image capture devices such as cameras 52 may be arranged so as to capture images of portions of the ATM, portions of users of the ATM, portions of servicers of the ATM, or portions of the environment around the ATM. For example, an image capturing device 52 may be mounted in supporting connection with the housing of the ATM with a field of view encompassing a machine user's face. Another image capturing device may be mounted relative the ATM with a field of view of the environment immediately behind a machine user. The field of view of other image capturing devices may encompass areas of the ATM accessed by service personnel within the respective fields of view of the devices. It should be understood that the camera configuration shown is exemplary. It should further be understood that embodiments may include analog cameras, digital cameras, iris scanners, fingerprint scanners or other types of devices from which data corresponding to images may be acquired and/or reproduced. Some embodiments may operate in a manner that employs the principles described in U.S. Pat. No. 7,147,147, the disclosure of which is incorporated herein by reference.

The images captured by camera(s) 52 may be used, for example, to verify identity and/or provide security for the machine or users thereof. In an exemplary embodiment, the data store 50 may include data corresponding to images of unauthorized users of the machine. In an exemplary embodiment, the controller 48 is able to compare data corresponding to the images captured by camera(s) 52 with data in the data store corresponding to unauthorized users. If the data generated by camera(s) 52 corresponds to unauthorized user data in the data store, the controller is operative to carry out instructions, such as to activate an indicator which indicates the presence of the unauthorized user. The indicator may be an audible alarm, a message to a remote entity, a machine shutdown operation, or any other action able to indicate attempted use of or access to the machine by an unauthorized user. Alternatively, in some exemplary embodiments the data store may be located at the machine or accessed through communications to one or more computers at remote locations. In other embodiments the stored data may correspond to authorized users. Determining through operation of one or more controllers that image data corresponds to an authorized user may permit such authorized users to carry out certain operations. Of course these approaches are exemplary.

In the exemplary embodiment, ATM 10 also includes a movable image capture device 58 such as a camera, in operative connection with interface bus 42. When the ATM is in an operational mode, movable device 58 may be housed within the upper housing area. Alternately, a movable device may be housed within the lower housing area. Alternatively in some embodiments, the image capture device may be brought to the machine by a servicer and operatively connected to at least one controller, such as by plugging in a cable connected to a camera to a USB port. After a servicer attains access to the interior of the ATM housing, the movable device 58 may be utilized to aid servicing of machine components as described in greater detail below.

As schematically illustrated in FIG. 3, in exemplary embodiments, signals from the camera 52 may be sent to an image recorder device 54 which is connected to the interface bus 42. Image recorder device 54 includes a computer which includes at least one server operating therein, and further includes at least one data store 56. It should be understood that some embodiments may include devices which in addition to image data, acquire sound data, infrared signal data, and other types of data which can be sensed by sensing devices, stored, recovered, and analyzed by the system. This may include for example, sensing images which indicate the relative temperatures of various portions of parts, which temperatures may correspond to abnormal conditions. Image recorder device 54 may also receive inputs from devices such as sensors which can generally sense actions or conditions directly. Image recorder 54 may also receive signals representative of conditions or instructions sent as signals to other devices such as signals on the interface bus 42, timing signals, or others signals usable to operate the image recorder responsive to programmed instructions, time parameters, user inputs, or other conditions or signals. At least one server software function associated with the image recorder device 54 may be in communication with at least one electronic communications network schematically indicated 60. The server may operate to provide at least one uniform resource locator (URL) or other system communication address. Thus, the server may be accessed by other terminals connected to the network. The server may also selectively deliver messages to other network connected computers. The camera signals may alternately, or additionally, be sent to controller 48.

In an exemplary embodiment, terminal controller 48 is in communication with at least one network 60 and is able to be accessed by other terminals connected to the network, as well as able to deliver messages including data corresponding to visual images generated by camera 52 and movable image capture device 58 to connected terminals.

Network 60 may include a local area network such as an intranet or may be a wide area network such as the Internet. Network 60 may include a network that communicates messages in protocols such as TCP/IP. The network may be used to further communicate HTTP messages including records such as HTML, XML, and other markup language documents. Exemplary principles that may be used are described in U.S. Pat. Nos. 7,159,144; 7,162,449; 7,093,749; and 7,039,600 which are incorporated herein by reference in their entirety. Of course, in other embodiments other communications methods may be used.

In the embodiment shown, a plurality of terminals 62 are shown connected to the at least one network 60. Terminals 62 may include user terminals which may be used to analyze, store, and recover data sent from the ATM. Alternative terminals 62 may include document verification terminals for verifying the authenticity of documents, identifying user data or for carrying out other functions. Typically terminals 62 include computers including a browser software component 64 such as Mozilla Firefox™, Microsoft Internet Explorer™, or other types of browsers. Terminals 62 also include other software and hardware components schematically indicated 66 suitable for processing image data, transaction data, and other data that may be obtained by accessing the ATM.

Exemplary terminal 68 may be a user terminal, document verification terminal, data storage terminal, data analysis terminal, or other type of terminal for inputting instructions or analyzing data available in the system. Exemplary terminal 68 includes a computer schematically indicated 70 which includes at least one processor and an associated data store schematically indicated 72. Exemplary terminal 68 may be in operative connection with the computer 70 and input devices 74 and 76 which include a keyboard and mouse respectively in the embodiment shown. Of course in other embodiments other types of input devices may be used. Exemplary terminal 68 further includes output devices. The output devices in the embodiment shown include a monitor with a display 78 and a printer device 80. Of course in other embodiments of terminals other types of output devices may be used. The exemplary terminal 68 includes a computer with a browser component as previously described. The browser in the terminal communicates with the ATM through the network 60. Terminal 68 may also have server software operating therein as well as other software components.

It should be understood that in some embodiments the ATM may communicate with other computers and entities and through various networks. For example, the ATM may communicate with computers operated by service providers through network 60. Such service providers may be entities to be notified of status conditions or malfunctions of the ATM as well as entities who are to be notified of corrective actions. This may be done, for example, in the manner similar to that described in U.S. Pat. Nos. 7,036,049 and 7,003,492 the disclosures of which are incorporated herein by reference. Other third parties who may receive notifications from exemplary ATMs include entities responsible for delivering currency to the machine to assure that the currency supplies are not depleted. Other entities may be responsible for removing deposit items from the machine. Alternative entities that may be notified of actions at the machine may include entities which hold marketing data concerning consumers and who provide messages which correspond to marketing messages to be presented to consumers. Various types of messages may be provided to remote systems and entities by the machine depending on the capabilities of the machines in various embodiments and the types of transactions being conducted.

Figure 4:
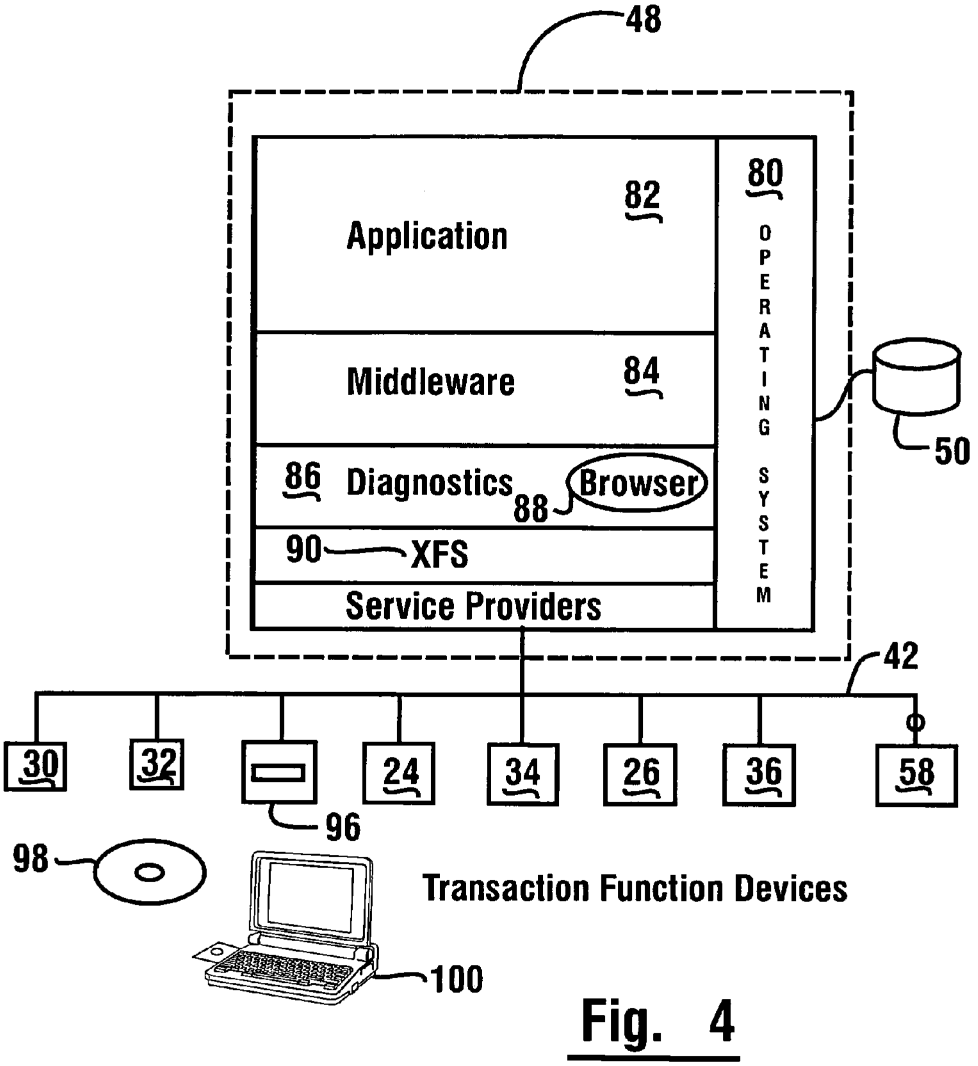
FIG. 4 is a schematic view showing an exemplary software architecture.

FIG. 4 shows schematically an exemplary software architecture which may be operative in the controller 48 of the ATM. The exemplary software architecture includes an operating system 80 such as for example Microsoft® Windows, IBM OS/2® or Linux. The exemplary software architecture also includes an ATM application 82. The exemplary application 82 includes the instruction for the operation of the automated banking machine and may include, for example, an Agilis® 91x application that is commercially available from Diebold, Incorporated. The exemplary software application operates ATMs, and may in some embodiments include a cross vendor application that is suitable for use in multiple brands of ATMs or other automated banking machines.

In an exemplary embodiment, a middleware software layer schematically indicated 84 is operative in the controller 48. In the exemplary embodiment, the middleware software layer 84 operates to compensate for differences between various types of automated banking machines and transaction function devices used therein. The use of a middleware software layer 84 enables the more ready use of an identical software application on various types of ATM hardware. In the exemplary embodiment the middleware software layer 84 may be Involve® software which is commercially available from Nexus Software, a wholly owned subsidiary of the assignee of the present invention.

The exemplary software architecture further includes a diagnostics layer 86. The diagnostics layer 86 is operative to enable accessing and performing various diagnostic functions of the devices within the ATM. In the exemplary embodiment, the diagnostics layer 86 operates in conjunction with a browser 88. The diagnostics layer may be in operative connection with various components which enable diagnostic functioning of the various transaction function devices. Other exemplary embodiments may include diagnostic applications as described in more detail in U.S. Pat. Nos. 7,104,441; 7,163,144; 7,093,749; and 6,953,150 the disclosures of which are incorporated herein by reference in their entirety. For illustrative purposes, the exemplary embodiment is described in terms of a software diagnostic layer 86 as schematically represented in FIG. 4. In the exemplary embodiment, at least one data store 50 is in operative connection with the controller 48 such that one or more data stores include status data which is associated with the status or conditions of serviceable components and/or diagnostic data associated with conditions or properties of at least one serviceable component. In an exemplary embodiment, the diagnostic data may be accessed when a diagnostic article 98 is placed in operative connection with the ATM as explained in further detail below.

As schematically represented in FIG. 4, controller 48 is in operative connection with at least one interface bus 42 which may be a universal serial bus (USB) or other standard or nonstandard type of bus architecture. The interface bus 42 is schematically shown in operative connection with one or more transaction function devices. The transaction function devices may include, for example, the currency dispenser 30, depository 32, card reader 24, receipt printer 34, keypad 26, as well as numerous other devices, generally designated 36, which are operative in the machine and controlled by the controller 48 to carry out transactions. In the exemplary embodiment, an image capture device 52 such as a charge-coupled device (CCD) camera is operatively connected to interface bus 42. In the exemplary embodiment one of the transaction function devices in operative connection with the controller is a diagnostic article reading device 96 which is operative to read a diagnostic article 98 used in servicing the machine. In an exemplary embodiment, the diagnostic article 98 comprises a CD which can be read by reader 96, and can also be read by a computer device 100 which is not generally associated with the operation of the ATM. Of course in other embodiments the diagnostic article may include local or remote items that can provide computer readable instructions, such as, for example, flash memory cards, smart cards, RFID cards, tokens or other articles.

In the exemplary embodiment, the diagnostics layer 86 is operative to perform various diagnostic functions with the transaction function devices, i.e., 24, 26, 30, 32, 34, 36, 96 which are operative in the ATM. In the exemplary embodiment, the diagnostic layer 86 is enabled to perform manipulations and diagnostic testing of the transaction function devices. In an exemplary embodiment, the diagnostic layer works in conjunction with the diagnostic article 98. The manipulations and/or diagnostic tests may include for example outputting an audible tone, turning on a motor, simulating inputs through a keypad, printing a test receipt, operating the cash dispenser and the like.

Figure 5:
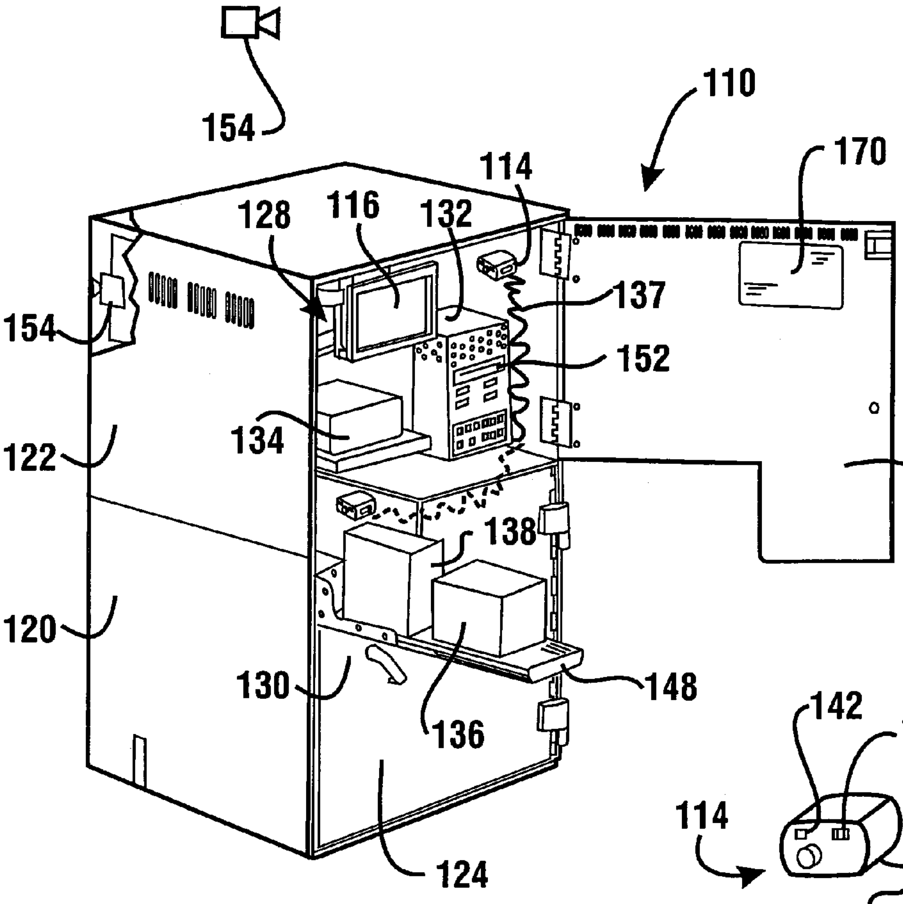
FIG. 5 is a schematic view of an exemplary automatic banking machine.

In an exemplary embodiment, shown in FIG. 5, there is provided an alternate embodiment of an automated teller machine 110 amenable to on-site or remote servicing and diagnosis. In particular, the exemplary ATM utilizes one or more movable image capture devices 114 in operative connection with one or more visual display devices to enable improved servicing capabilities. The exemplary embodiment illustrated in FIG. 5 shows a rear-load ATM 110 having a service display 116.

Exemplary ATM 110 may be similar in many respects to the exemplary machines previously described herein. ATM 110 includes housing 120 which may include an upper housing area 122 and a secure chest portion 124 in a lower portion of the housing, although exemplary embodiments are not so limited. Access to the upper housing area for service may be provided through movement of an access door 126 away from an opening 128 in housing 120. Access to the interior of secure chest portion 124 may be provided through movement of the chest door 130.

As schematically represented in FIG. 5, ATM 110 includes one or more internal controllers 132. Such controllers 132 may be in operative connection with one or more data stores as previously described. In some embodiments controllers may be located on certain devices within the ATM so as to individually control the operation thereof. Various transaction function devices, schematically represented 134 and 136 in FIG. 5, may be in operative connection with the controller 132 through a USB or other connection as previously described.

In an exemplary embodiment, the image capture device 114 may be mounted in operatively supported connection with the upper housing area 122 when the ATM is in an operational condition. In other embodiments, the image capture device 114 may be mounted in the secure chest portion 124. In yet other embodiments, the image capture device may be carried to the ATM by service personnel and operatively connected to the controller once access to the housing interior is gained.

In the embodiment shown, the image capture device 114 is in operative connection with the controller 132 through cable 137 connected through a USB connection or port. The cable may include a suitable plug-in or other type connector. ATM 110 includes at least one serviceable component schematically represented as 138. The serviceable component may include any of the aforementioned input devices, output devices, transaction devices, or any other component operable with respect to the ATM which requires inspection and/or service. The serviceable component 138 may include at least one region which is not directly visually observable to a servicer of the ATM attempting to view the component through an access opening of the housing. For example, the region may be disposed within the housing of the ATM at a location that is awkward or impossible for a servicer to view directly.

Figure 6:
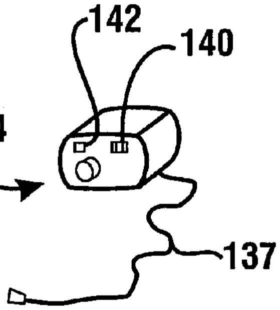
FIG. 6 is a schematic representation of an exemplary movable image capture device.

In order to facilitate servicing of the component 138, an image capture device 114 may be utilized. With reference to FIG. 6, in the exemplary embodiment, the image capture device 114 may include a digital camera. The exemplary image capture device 114 is able to be moved toward and away from a region of interest to service personnel. In some embodiments the image capture device may be permanently or releasibly attached to a rigid or flexible wand or similar supporting device that can be used to extend the camera to have a field of view that includes the regions of interest to the service.

A microphone 140 or other sound sensing device may be mounted in operative supporting connection with the image capture device 114 and movable therewith. The microphone 140 may be disposed within a housing of the image capture device, or mounted in connection with a common support such as the wand. The microphone in the exemplary embodiment is in operative connection with a controller, and is operative to produce sound data that corresponds to sounds sensed by the microphone. Additionally, a radiation source 142 may be mounted in supporting connection with the image capture device 114 and movable therewith. The radiation source may emit visible light. In other embodiments, the radiation source may emit non-visible light, such as radiation emitted by an infrared LED. Thus, the obscured region may be illuminated to provide an enhanced visual image. In still other embodiments, thermal images may be sensed.

In alternate embodiments, one or more microphones 140 may be mounted in fixed relationship to housing 120 in positions adjacent the transaction function devices to produce sonic information related to such devices. Additionally, in alternate embodiments, one or more radiation sources 142 may be positioned so as to illuminate areas of the transaction function devices to enable enhanced images to be captured.

In the exemplary embodiment, the image capture device 114 is enabled to be moved toward and away from regions of interest to the servicer. Thus, the field of view of the image capture device 114 is changeable and able to encompass various locations within and outside the housing 120. The exemplary image capture device 114 in conjunction with the controller is operative to generate image data corresponding to a visual image of the region of interest. The controller 132 is operative to cause output of an image corresponding to the visual image data to a visual display. This may be done in response to one or more inputs by a servicer through one or more input devices connected to the machine or in response to instructions executed by the controller.

The visual display may be the display such as display 28 (FIG. 1) which additionally serves as an output device to a user at the customer interface of the ATM. In other exemplary embodiments, the visual display may be a service display 116 (FIG. 5) mounted in a rear of the ATM housing that may be viewed by a servicer having access to the rear of the machine. Alternately, or additionally, the image data may be transmitted to a remote computer including an operatively connected display 78 through network 60 (FIG. 3). In yet other exemplary embodiments, the visual display component may include a device separate from the ATM such as a computer screen, cell phone, hand-held device, and the like. Thus, viewing images on the display enables a servicer to indirectly view obscured areas of components requiring service.

An exemplary ATM having a service display located within the housing is described with greater specificity in U.S. Pat. No. 7,156,296, which is incorporated herein in its entirety. As disclosed more fully in the incorporated document, the service display 116 may be movable relative to the housing for the convenience of the servicer. The service display may be incorporated as part of a second user interface disposed from the user interface previously described.

As illustrated in FIG. 5, in an exemplary embodiment, one or more serviceable components are supported on a rollout tray 148 that is movable between a retracted position generally disposed within the ATM housing, and an extended position. In the extended position the rollout tray extends through the opening 128 in the housing. In other embodiments, the serviceable components may be accessed by opening or removing one or more service doors or panels 150 (illustrated in phantom in FIG. 1). In yet other embodiments fascia components may be moved to provide access to serviceable components.

In an exemplary embodiment, a diagnostic article reading device, schematically indicated 152, is in operative connection with the controller 132. The diagnostic article reading device is operative to read computer executable instructions from a diagnostic article, such as article 98, when it is placed in operative engagement with the diagnostic article reading device. As previously described, the status data and/or diagnostic data may be communicated to a remote computer through a network such as network 60. Thus, a user of a remote computer may access status and/or diagnostic data relevant to the component to be serviced, including images captured by the image capture device 114. In addition in some embodiments data corresponding to sound data and/or temperature data may be sent through operation of the controller to a remote computer. As a result a remote computer may be connected to speakers or other sound output devices so a person at the remote computer can hear the sounds picked up by the microphone 140. In some embodiments the controller in the banking machine and/or the remote computer may be operative to analyze the sound and/or temperature data, and provide one or more outputs that correspond to information about the condition of one or more transaction function devices. Further, in some embodiments the images captured by the image capture device 114 may be stored as diagnostic data in an image recorder device such as device 54 as previously described.

Exemplary embodiments may have one or more additional image capture devices schematically represented by device 154. As will be appreciated, a number of devices may be positioned within and/or near to ATM 110 for purposes of capturing image data related to users, documents, surroundings, or other types of visual images that may be desirable to capture and analyze. In addition to capturing images or other data from one or more automated banking machines, the image capture device 154 may also be operative to monitor one or more other transaction devices, as well as to monitor and record activities which occur within a facility. An additional image capture device 154 may be mounted in fixed supported relationship with the ATM housing. For example, an image capture device may have a field of view that includes the vicinity in front of the user interface of the banking machine. Thus, a servicer located at the rear of the ATM can view images of activity or persons in front of the machine in a service display 116. In other exemplary embodiments, an image capture device may be used to monitor activity behind a servicer performing service at the front of the machine. Thus, the servicer can be alerted about the approaching presence of a potential machine customer, or other person.

In some embodiments the data obtained by the image capture device 154 may be used to identify a physical feature of a machine user, as set forth in greater detail in U.S. patent application Ser. No. 09/991,748, filed Nov. 23, 2001, which is incorporated herein by reference. The images may be used for other purposes as well. For example, the facial features of criminals, missing persons, or other individuals of interest may be stored in connection with the data store. The system may operate so that images captured may be analyzed so that the facial features of persons in images are compared to images stored in one or more local or remote data stores. Responsive to finding a match the system may operate in response to programmed instructions to cause a processor to execute a sequence of activities which may include capturing additional images, sounding alarms or sending messages electronically to selected individuals or entities.

Some embodiments may use voice recognition software to detect sounds from the microphone representative of words or the stress levels of sounds emanating from persons near the automatic banking machine. Such voice or sound data may be used in combination with images or other data to further detect and evaluate conditions at or near the automated banking machine.

An exemplary embodiment may include sensing devices for detecting the opening of doors, windows, ventilation ducts or other activities for which it is desired to capture images. The exemplary system may include alarm devices. Alarm devices may take various forms and may include sequences of inputs to computer terminals or other devices.

Sensing devices used in connection with the exemplary systems may include photosensors, infrared sensors, radiation beams, weight sensors, sonic detectors, ultrasonic detectors or other types of detectors. Such detectors may be used to sense when a person or item passes or occupies a particular space or area. For example, a detector may detect when an invisible beam type sensor is interrupted. As a result, a signal may be given to cause a computer to capture images in response to each occurrence of something interrupting the beam.

Figure 7:
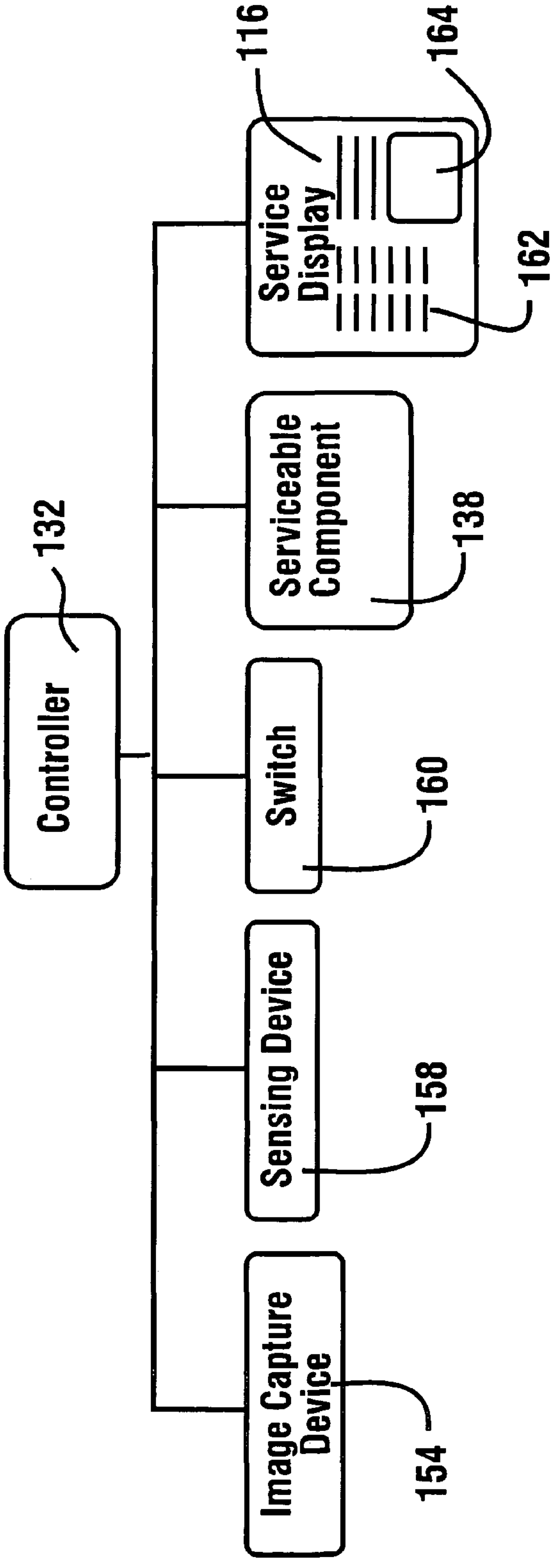
FIG. 7 is a schematic representation of a system for servicing an automated banking machine.

The relationships of some of the components of an alternative exemplary embodiment are schematically represented in FIG. 7. An exemplary embodiment may include sensing devices 158 which detect or receive indications of activity and provide appropriate electrical outputs to controller 132. These devices may include for example heat sensors, infrared sensors, weight sensing pads, electronic beams or other types of sensors which can detect conditions for which an operator of the system may wish to capture images or other data. Sensing devices may be utilized to sense activity in the vicinity of the ATM or activity associated with one or more machine components.

In an exemplary embodiment, the data corresponding to visual images generated by the image capture devices 154 may be analyzed for certain image conditions. Image conditions may include for example, a lack of contrast in an image, brightness or darkness beyond selected limits signaling a lack of useable video. Alternatively, image conditions may include the presence within a field of view of persons with particular clothing or features, the presence of persons with certain body orientations, the presence of a particular individual based on facial features or other features, the presence of certain objects such as weapons or the presence of particular types of colors or arrangements of colors.

In an exemplary embodiment, the ATM is selectively operable in an operational mode and a service mode. When the ATM is in the operational mode, machine users are generally able to complete transactions of value at the ATM by inputting information to one or more input devices at the user interface and receiving outputs from one or more output devices. This may include for example, users inputting a card and personal identification number (PIN). The data read from the card is then compared to stored data usually by communication to a remote host computer and comparing the card data to data in the host computer's data store. The data corresponding to the input PIN is also compared for correlation to stored data corresponding to the card data. If the comparison indicates that the card and PIN data correspond to an authorized user the ATM operates to carry out transactions involving the customer's account.

At times, service providers must interact with automated banking machines to perform routine maintenance, replenish supplies, or otherwise service a machine component. In an exemplary embodiment, a service activity may be performed on the ATM by an on-site service provider, by a remote service provider, or a combination of an on-site service provider is communication with a remote entity or system.

The exemplary ATM is enabled to operate in a service mode so that such service activity can be completed. The service mode may be initiated by an on-site service provider performing an action such as opening the ATM housing to access a serviceable component. In other exemplary embodiments, the service mode may be initiated by sending a signal to a controller in the machine through an input device that is located either on-site or remotely.

At least one controller 132 in operative connection with the serviceable component 138 is able to provide status data relating to the status of the serviceable component. For example, the status data may include information about a malfunctioning component or a maintenance history.

In an exemplary embodiment, a service provider may utilize one or more image capture devices 154 during performance of the service activity. Exemplary image capture devices 154 may be able to generate data corresponding to visual images within a predetermined vicinity of the ATM. Other exemplary image capture devices may be able to generate data corresponding to various regions within and outside the ATM housing. The image capture devices 154 may be mounted in fixed relationship to the ATM housing, may be a moveable device that the servicer may selectively position, or may be mounted within the vicinity of the ATM, all as previously described.

The visual images corresponding to the generated data may be displayed on an output device. In an exemplary embodiment, the visual images are output to a service display 116 which is disposed away from a user interface intended for use by machine customers. In an exemplary embodiment, the service display 116 is mounted at the rear of the ATM housing. The service display is in operative connection with the controller 138. In an exemplary embodiment, the service display is enabled to display visual images from the image capture devices 154. This may be done in some embodiments responsive to one or more inputs by a servicer through one or more input devices in operative connection with the controller. In an exemplary embodiment, the service display is also able to display indicia corresponding to status data about one or more serviceable components.

For example, the ATM may be mounted through a wall or other structure which may prevent a servicer at the rear of the ATM from directly viewing activity in the vicinity of the ATM. This may be done in a manner like that described in U.S. Pat. No. 7,163,613 the disclosure of which is incorporated herein by reference. The servicer is enabled through the image capture devices, microphones, and service display to indirectly perceive activity at the front of the machine.

In the exemplary embodiment, a switch 160 which serves as an input device in operative connection with the controller 160 enables the visual images captured by one or more image capture devices 154 to be selectively output on the service display 116. The switch 160 may include one or more locations on the service display responsive to tactile input from a machine servicer. Alternately or additionally, the switch may be responsive to one or more sensing devices 158 able to detect movement and/or sound in and around the ATM, as previously described. The exemplary banking machine may include speakers or other sound output devices at the rear of the exemplary banking machine so a servicer may hear activity in the area at the front of the machine.

The information displayed on the service display 116 may alternate between status data and visual images captured by the image capture device 154 responsive to the controller. In an exemplary embodiment, an event sensed by the sensing device 158 (such as a camera or microphone) may cause the display 116 to switch from displaying status and/or diagnostic information, to displaying visual images obtained by one or more image capture devices 154. Thus, a servicer viewing status data related to one or more serviceable components may be alerted to the approach of a potential machine user by a change in the output on the service display 116. Alternatively the service display may change its outputs responsive to servicer inputs to one or more input devices.

In other exemplary embodiments, the service display 116 may simultaneously display status data and visual images. In an exemplary embodiment, the service display 116 includes a primary field area 162 and a secondary field area 164. The exemplary switch 160 may incorporate technology, such as picture-in-picture, to allow information displayed in the primary field to be switched with information displayed in the secondary field. In other embodiments status data may be superimposed on the screen in front of output images. Of course these approaches are exemplary.

In an exemplary embodiment, the image capture device 154 has an area in front of the ATM within its field of view, which is not directly viewable by a servicer of the machine located at the rear of the ATM. A sensing device 158 operative to sense movement and/or sound caused by a potential user of the ATM, may alert the servicer of the presence of the potential user. In response to the sensed presence of the potential user, the output on the service display 116 may switch from displaying status information in the primary field, to having visual images generated by the image capture device displayed in the primary field. If practical, a servicer may then provide one or more inputs operative to cause the controller to change the mode of the ATM from a service mode to an operational mode to accommodate the potential machine user. The servicer may alternatively provide one or more inputs through an input device that causes the controller to cause the output of an indication on the display of the user interface that the ATM is out of service. Of course these approaches are exemplary.

In an exemplary embodiment, a servicer at the rear of the ATM is enabled to view the service display without opening the ATM housing (see FIG. 5). A viewing window 170 may be provided in a wall portion of the ATM housing. In some cases the wall portion may be a part of a movable door. Of course this approach is exemplary. Thus, in some embodiments certain service activities may be performed without the need to move any portion of the ATM housing. For example, a routine maintenance check of various serviceable components in the ATM can be conducted by providing inputs that result in switching the ATM from an operational mode to a service mode and directing the controller to run diagnostic tests as discussed above. Status information about the transaction function devices of the machine can be output on the service display responsive to operation of the controller. If further service is not required, the machine can be readily returned to an operational condition. Alternately, if a potential user is sensed at the front of the ATM, again, the machine can be readily returned to the operational condition. If however, the diagnostic tests reveal a problem that requires more extensive service, the housing of the ATM can be opened and the component of interest may be serviced.

In an exemplary embodiment, a method includes generating data corresponding to a visual image of a serviceable component of an ATM with a movable image capture device. The serviceable component may include a region that is not directly visually perceivable by a machine servicer, but which may be placed within the field of view of the image capture device. A visual image of the obscured region may be displayed on a display, in supporting connection with the ATM and/or disposed from the machine at a remote location.

In an exemplary method, a microphone in operative connection with the image capture device is utilized to generate data corresponding to sonic information. The visual and/or sonic information may be used as diagnostic information about a serviceable component or may include information about activity in the vicinity of the ATM. The data corresponding to the visual images and the sonic information may be output responsive to operation of the controller through a display, speakers or other output devices at the ATM location, and/or may be transmitted responsive to operation of the controller to a remote computer.

In an exemplary method, a radiation source in operative connection with the image capture device is utilized to direct radiation onto the region that is within a field of view of the image capture device. The radiation source may in some embodiments produce visible light, visible light within a particular region of the visible spectrum and/or nonvisible radiation. The radiation source may be utilized to illuminate the region of interest and enhance the visual images captured by the image capture device.

Figure 8:
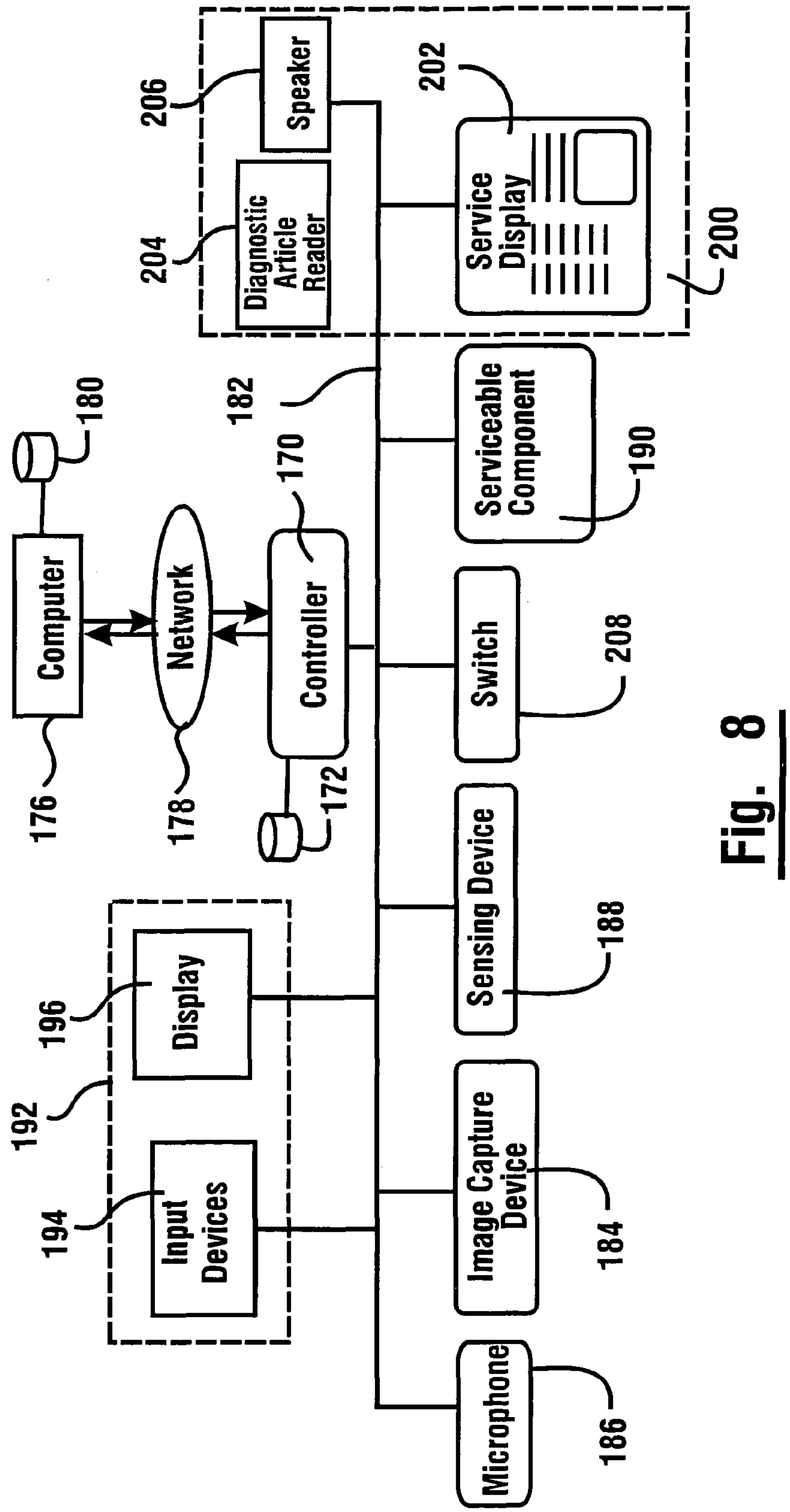
FIG. 8 is a schematic representation of a system for servicing an automated banking machine.

A further exemplary embodiment is schematically represented in FIG. 8. The exemplary embodiment includes an on-site controller 170 in operative connection with at least one data store 172. The controller 170 may be enabled to communicate with a remote computer 176 through a network 178. The remote computer may be in operative connection with one or more data stores 180.

Various devices in the ATM are operatively connected to controller 170 through USB 182. Some exemplary devices include one or more image capture devices 184 (fixed or movable), microphones 186, sensing devices 188, and one or more serviceable components 190 such as that previously described.

The exemplary embodiment includes a first user interface 192 which may include input devices 194 and a display 196. The exemplary embodiment includes a second user interface 200 which includes a service display 202 such as that previously described. The second user interface may also include a diagnostic article reading device 204 and one or more speakers 206.

In an exemplary embodiment, data from the image capture device may be displayed as visual images on display 196, service display 202, and/or transmitted to one or more remote computers 176.

The service display 202 is generally accessible to service personnel. In an exemplary embodiment, one or more microphones 186 are able to pick up sounds associated with activity in the vicinity of the ATM. The microphone 186 may be associated with one or more image capture devices, or may be a separate component. In the exemplary embodiment, the microphones may be in operative connection with one or more speakers 206 which are able to provide audible outputs associated corresponding to the audio input. In an exemplary embodiment, the speakers 206 are located at the rear of the ATM and may be part of the second user interface 200. Thus, a servicer at the rear of the ATM can indirectly monitor activity within a vicinity of the user interface of the ATM through visual images output on the service display, and audible outputs provided by the speakers. In still other embodiments an image capture device and microphone may be positioned at the rear of the machine housing, and outputs corresponding to the visual images sensed and sounds sensed selectively output through the display and speakers of the customer interface at the front of the machine.

In an exemplary service activity, a first servicer may be positioned at the front of the machine and a second servicer may be positioned at the rear of the machine. The audio/visual components allow the two servicers to communicate. This may be done in some embodiments responsive to operation of the controller responsive to one or more inputs from the servicers through input devices at the respective user interface. Of course this approach is exemplary.

As earlier discussed, status data related to one or more serviceable components 190 may be obtained from a data store 172 in operative connection with the controller 170 or from distributed data stores associated with processors on respective transaction function devices. Diagnostic data which can be used to determine information about features or conditions of devices which can be used to diagnose properties or conditions that indicate causes of status data or conditions that may result in a future status or fault can also be accessed from one or more data stores. Such diagnostic data in the exemplary embodiment is generally not accessible to servicers except responsive to instructions and/or data included on a diagnostic article, e.g., 98, which can be read when placed in operative connection with the controller through a diagnostic article reading device 204. Alternatively the diagnostic article may be used to permit access to diagnostic data from a computer at a remote location. Diagnostic data associated with the serviceable component may be transmitted to the remote computer. Such permitted access to diagnostic data may be permitted through operation of the controller responsive to the instructions read from the diagnostic article. Access may be permitted by the controller responsive to receipt of locally provided or remotely communicated inputs. The serviceable component may be subjected to a diagnostic test, responsive to operation of the at least one controller. For example, such diagnostic tests may include printing of a test receipt, directing a document along a document path, moving gate members, producing audible tones, picking cash, presenting cash, and other device operations. Visual images of the progression of the diagnostic test, and associated sonic information may be output through visual and audio output devices to an on-site servicer and/or an entity at a computer at the remote location. The generated data may be saved to the diagnostic article or a data store in the ATM and/or at a remote computer. The generated data may also be sent to an image recorder device as previously described.

In other exemplary methods, the diagnostic article may be engaged with an appropriate reading device at a remote location from which data that permits access to diagnostic information can be transmitted to the ATM. The remote computer may also be used to provide inputs that permit access to diagnostic data stored at the ATM. An on-site servicer can utilize the image capture device and/or microphone to monitor progress of diagnostic tests. The data corresponding to visual information, sonic information and/or thermal information can be transmitted for analysis to the computer at the remote location. The computer at the remote location may be in connection with a display and/or audio output devices so a remote servicer can perceive the operation of the ATM and identify condition. Alternatively or in addition the remote computer may operate in accordance with its programming to analyze one or more of the status data, diagnostic data, image data and/or sound data to produce outputs indicative of problems and/or desirable service activities for the ATM.

In an exemplary method, a servicer at the ATM location may communicate with an entity at a computer at a remote location. The communication may be accomplished though a network 178, such as the Internet, or through other communications network. For example, a service person or computer at a remote location can perceive data generated by the image capture device 184 and/or microphone 186 at the remote location and transmit diagnostic instructions or service information to the on-site servicer.

In an exemplary method, one or more additional image capture devices 184 may be utilized to generate visual image data of other regions within or outside the ATM. For example, an additional image capture device may be mounted in fixed relationship to the ATM housing and include a substantially constant field of view. Data generated by the fixed image capture device may be displayed through an on-site display screen, or at a remote location. Sensing devices 188 are enabled to sense activities in and around the ATM. For example, one or more sensing devices may be operable to sense the approach of a potential ATM user. A switch 208 may be used to selectively change the output on display 196, service display 202, and/or computer 176. For example in some embodiments the servicer may provide at least one input that allows the ATM to carry out transactions for the consumer, and thereafter provides a further input to allow continued service activity. Alternatively the servicer may provide at least one input through a servicer accessible input device that is operative to cause the controller to cause an output through the consumer display indicating that the ATM is not in service. Of course these approaches are exemplary.

In an exemplary method, a servicer may perform a service activity on at least one serviceable component of an ATM, such as a currency dispenser. For example, a common service activity includes testing the operation for dispensing currency from the currency dispenser. Alternatively in some embodiments the service activity may include adding or removing currency from the currency dispenser. Access to the serviceable component may be made through a rear access opening of the ATM after opening an associated door. The service display, located at the rear of the exemplary ATM housing, is able to display status and other data of interest to the servicer, as noted above responsive to operation of the at least one controller. Additionally, an image capture device in operative connection with the service display generates data corresponding to a plurality of visual images of objects within a region of the ATM which may not be directly viewable by the servicer. For example, the generated visual images are able to indicate if a potential ATM customer is at the user interface. In an exemplary method, a sensing device senses the presence or absence of a potential ATM customer within the predetermined vicinity. If a potential ATM customer approaches the ATM, the data displayed on the service display may change responsive to a signal from the sensor. Thus, in the exemplary embodiment instead of displaying the status information, the service display may display the generated visual images.

In an exemplary method, the service display may operate to display both status information and visual images in two separate field display areas. A first field display area may be larger than a second area and be considered a primary field. The second area may be a smaller, secondary field, such as a picture-in-picture. When the servicer is performing a service activity, if the sensor senses the absence of a potential customer adjacent the machine, then indicia corresponding to status data may be displayed in the first area, and visual images generated by the image capture device may be displayed in the second area. In an exemplary method, if the sensor senses the presence of a potential customer within the predetermined area, a signal is sent to the controller, which operates in accordance with its associated programming to switch the output on the service display so that the visual images are displayed in the first area and the status information is displayed in the second area. The servicer can make a determination about whether to provide inputs to switch the ATM into operational mode, so as to not disappoint the potential customer, or to retain the ATM in the service mode so that the service activity may be completed. Of course this approach is exemplary and in other embodiments other approaches may be used. This may include, for example, superimposing the output status text or other data on images corresponding to the field of view of the camera responsive to operation of the at least one controller of the ATM.

An exemplary service activity may require that the interior of the housing be accessed. In an exemplary method, the serviceable component is accessed through an access opening in the housing of the ATM. Additionally, the serviceable component may be supported on a rollout tray. In an exemplary method, the serviceable component is accessed by extending the rollout tray through the access opening to a service position.

In an exemplary method, a diagnostic article is placed in operative connection with the ATM controller. The controller is able to permit access to diagnostic data stored in the ATM concerning serviceable components. Indicia related to the diagnostic data may be output through the service display. This may be done responsive to operation of the at least one controller in response to local and/or remote inputs through input devices.

In another exemplary method, a service activity may be performed on a serviceable component responsive to inputs to a computer operatively connected to the ATM, but operating at a remote location.

Figure 9:
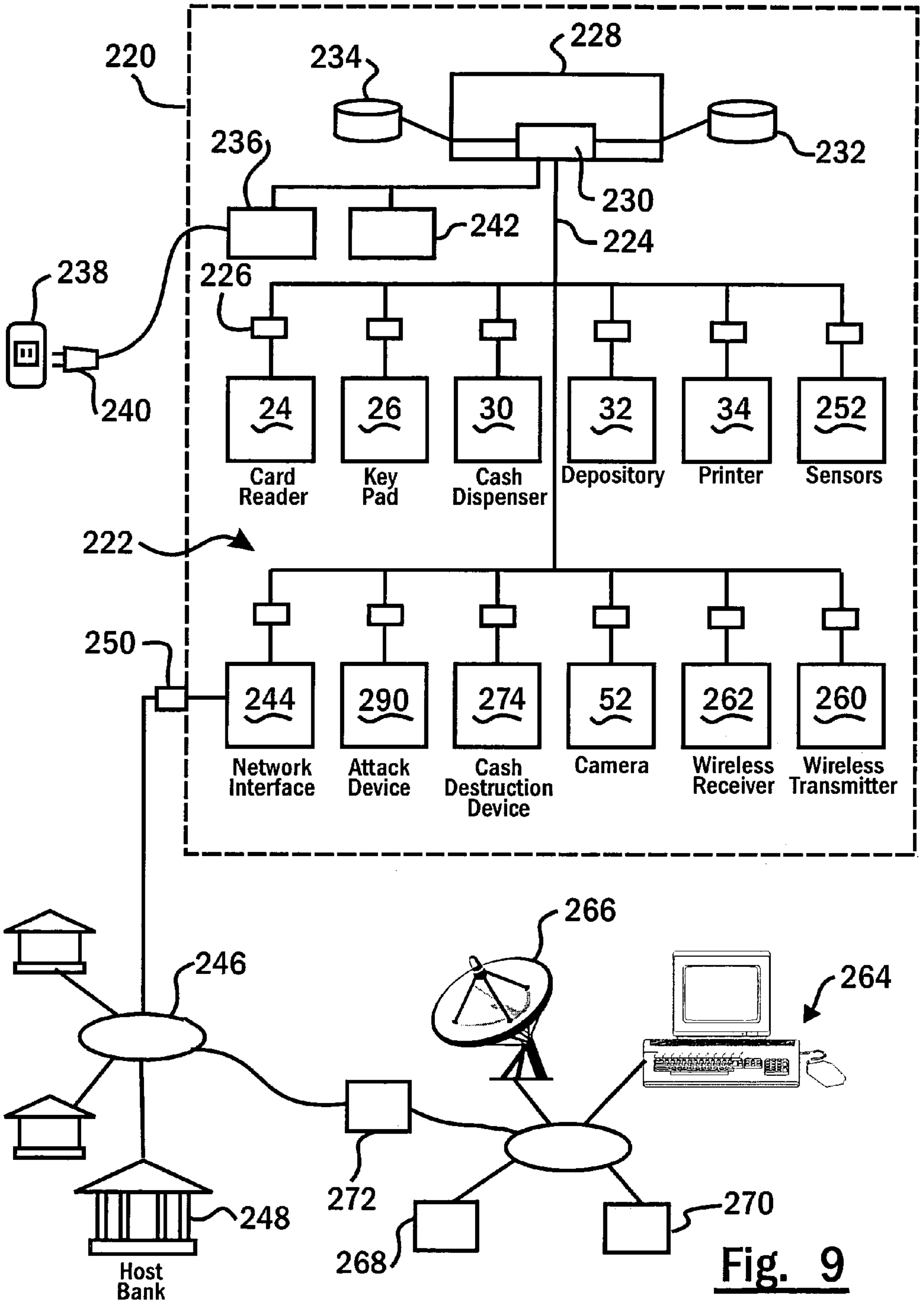
FIG. 9 is a schematic view of an automated banking machine and related systems.
Figure 10:
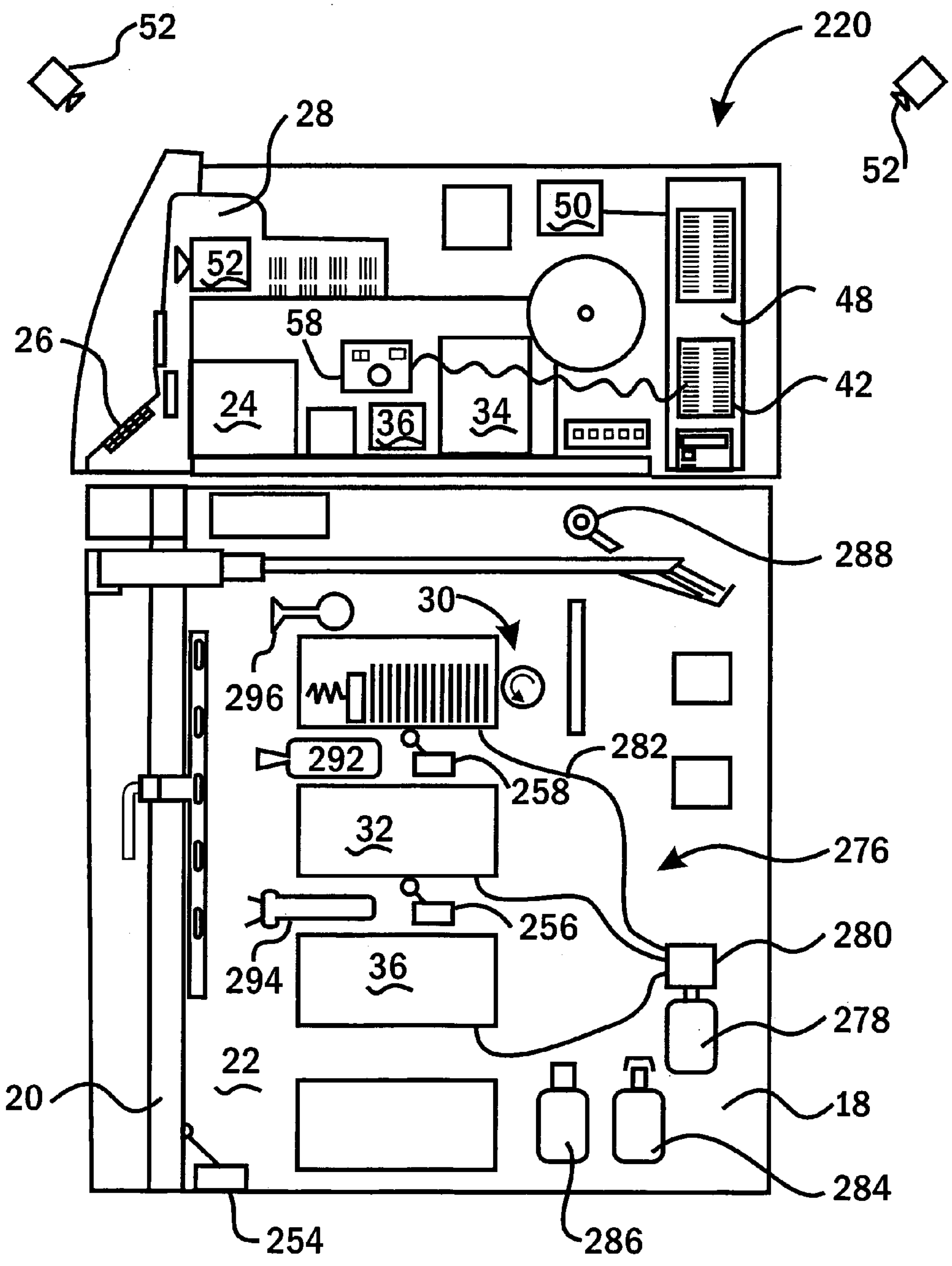
FIG. 10 is a schematic side view representation of an automated banking machine of an alternative embodiment.

A further alternative exemplary embodiment of an automated banking machine and system is represented in FIGS. 9 and 10. Automated banking machine 220 includes many of the features previously described in connection with automated banking machine 110. Common components are marked with the same reference numbers to avoid undue complexity in the description thereof. Of course it should be understood that embodiments may include different or additional devices, components and features.

The exemplary automated banking machine which comprises an ATM 220 includes a plurality of devices 222. Devices 222 include some of those previously discussed. These include a card reader 24. Card reader 24 is usable for reading data bearing records in the form of user cards including indicia thereon that identifies a customer and/or their associated financial accounts. Card reader 24 in various embodiments may be a magnetic stripe reader, smart card reader, radio frequency (RF) reader, RFID reader or other reading device. Banking machine 220 further includes a keypad 26 for providing manual inputs. It should be understood that in some embodiments the keypad may also be provided in the form of a touch screen interface in which users can provide inputs by touching areas of the display. Of course in other embodiments other types of manual input devices may be used.

The exemplary embodiment of banking machine 220 further includes a cash dispenser 30, a depository 32 and one or more printers 34. These may be of the types previously described. It should also be understood that other embodiments may include other transaction function devices such as check acceptors, check issuers, money order printers, gaming material readers, coin dispensers or other devices that may be appropriate in connection with carrying out transactions. It should also be understood that each of the devices is connected through one or more connections to an internal communication system schematically represented as a bus 224. Bus 224 may be a USB type network or other standard or nonstandard communications interface. In addition each of the devices is connected through one or more respective device interfaces which are also referred to herein as drivers 226. It should be understood that the nature of the interface would depend on the nature of the device as well as the type of communications bus used within the machine.

The exemplary embodiment further includes one or more cameras 52 which may be of the types previously described. In the exemplary embodiment the ATM may have one or more cameras operatively connected to the ATM. In some exemplary embodiments the cameras may be located internally of the housing of the ATM. The cameras may have a field of view external of the ATM either at all times or only when access doors on the housing are open. The particular camera arrangement and the number of cameras used, depends on the particular ATM involved and the operator of the system.

The exemplary automated banking machine further includes a controller 228. Controller 228 includes one or more processors 230. It should be understood that although one controller and processor are shown, embodiments may include multiple controllers and processors.

In the exemplary embodiment the at least one processor is in operative connection with a data store 232 and a second data store 234. Although these data stores are indicated as single data storage devices it should be understood that they may each be comprised of multiple data storage devices. As is further discussed in more detail, data store 232 includes in the exemplary embodiment, computer executable instructions that comprise application instructions that are operative to cause the automated banking machine to carry out the transaction functions for consumers as well as servicing functions. In the exemplary embodiment this may include for example, an ATM application software layer, middleware, software, service provider software which includes extensions for financial services (XFS), such as JXFS or Windows XFS compatible interfaces, as well as diagnostic software. Thus in the exemplary embodiment the data store 232 contains the software that operates during normal operation of the ATM, such as in carrying out transactions and as in carrying out ATM servicing activities. Of course this approach is exemplary and in other embodiments other approaches may be used.

In the exemplary embodiment data store 234 includes exception software instructions. In the exemplary embodiment the exception instructions are executed during exceptional circumstances that may be encountered by the automated banking machine. As later discussed the exception instructions of the exemplary embodiment are intended to operate when the machine is subject to conditions that are indicative of a theft in which the machine is being taken from its intended operational location. This includes circumstances in which the machine has been disconnected from its normal external power source and network connection. Of course in other embodiments the exception instructions may be operative in circumstances other than a theft scenario. This may include for example, situations where the automated banking machine has undergone conditions where significant parts of its programming or other devices may have been destroyed and the machine needs to recover. This may include for example, circumstances where the machine has lost some or all capabilities its operating system or other instructions normally included in data store 232 and therefore the capabilities of the executable instructions in data store 232 would be unable to cause the machine to perform at least some of its normal activities. Of course these approaches are exemplary and in other embodiments other approaches may be used.

In the exemplary embodiment processor 230 is of the type that is enabled to operate in an out-of-band condition. This means that the processor is enabled to execute the instructions included in the at least one data store 234 even when the machine's operating system is not operational. This may include for example, situations where the machine has been turned off and/or has been disconnected from its normal source of electrical power. An out-of-band processor with such capabilities may include processors with Active Management Technology capabilities from suppliers such as Intel Corporation. Of course in other embodiments other approaches may be used.

In the exemplary automated banking machine 220, the machine includes a power supply 236. Power supply 236 receives power from an AC power source 238. In the exemplary embodiment the AC power source is a conventional 110 volt or 220 volt power socket as is suitable for supplying power for operation of the machine. The power supply is connected through an AC power connector 240. The AC power connector 240 may include a cord and plug type connector which is accepted in the socket of the AC power source 238. Of course these approaches are exemplary and in other embodiments other power sources may be used.

Power supply 236 provides power that is used by the processor and other devices in the machine. This may include for example a suitable power level such as a 24 volt DC source for operating motors, illumination devices and other types of devices needed in the machine. Of course the power supply may also be connected through transformers, rectifiers and/or other devices in the machine that adjust the electrical power to that specifically useful by the particular transaction function device. Of course this approach is exemplary and in other embodiments other approaches may be used.

In the exemplary embodiment a battery 242 is in operative connection with the power supply 246. Battery 242 is a rechargeable type battery which is suitable for providing power to the processor and other selected devices in the automated banking machine. Battery 242 supplies battery power at a suitable level for operation of the processor 230 in an out-of-band environment. Thus for example in an exemplary embodiment which uses Intel Active Management Technology, the battery power needs to supply at least approximately 3.3 volts DC in order for the processor to execute the exception and instructions. Of course it should be understood that in other embodiments higher battery voltages may be provided depending on the particular transaction devices that are to be operated in the out-of-band environment. In addition it should be understood that the battery 242 may also perform the function of providing a source of power to minimize the risk that processors included in the machine will lose data residing in the random access memory in the event of a power outage. Of course these approaches are exemplary and in other embodiments other approaches may be used.

In the exemplary automated banking machine 220, the at least one processor 230 is in operative connection with a transaction network interface device 244. Interface device 244 includes a suitable network interface card or similar mechanism that enables the machine 220 to communicate in a financial transaction network schematically indicated 246. In an exemplary embodiment, the network interface 244 enables communication with one or more remote computers including for example a first computer located at a bank 248. As can be appreciated in carrying out financial transactions for consumers the exemplary automated banking machine communicates messages through the network interface 244 to the appropriate host computer at a bank or other appropriate financial transaction computer, to carry out financial transactions. This may be done for example in the manner of the incorporated disclosures. In addition in the exemplary embodiment the network interface is operatively connected to the communication line or other suitable device that leads to the network 246 through a releasible connector 250. It should be understood that although in the exemplary embodiment the network connection is described as a wired connection, in other embodiments a wireless connection may be used.

In the exemplary embodiment the at least one processor 230 operates in response to the application instructions in the data store 232 to periodically send messages through the network even when the machine is not operating to perform a transaction. Likewise the network periodically sends a message to the banking machine to which it responds to indicate that the banking machine remains working and connected to the network. In this way the at least one processor 230 is enabled to determine whether the banking machine is in operative connection with the network. Of course this approach for determining if the ATM remains connected to the network is exemplary, and in other embodiments other approaches may be used. In addition in the exemplary embodiment, computer executable instructions which can be carried out to determine if the banking machine remains connected to the network may also be included with the exception instructions stored in the data store 234. Of course this approach is exemplary.

Banking machine 220 further includes a plurality of sensors schematically represented 252. Sensors 252 may be of various types such as contact sensors, photo sensors, magnetic sensors or other types of sensors suitable for determining the presence or condition of various types of devices. For example as shown in FIG. 10, the sensors may include a sensor 254 which is operative to sense whether the chest door of the ATM is in an open or closed position. In addition in some embodiments sensors may include sensor 256. Sensor 256 is operative to sense whether a deposit holding container associated with the depository is still in position. Also in some embodiments a sensor 258 may be included. Sensor 258 is operative to sense whether a cassette which holds currency bills that are picked and dispensed through operation of the cash dispenser is in place. Of course as can be appreciated numerous other types of sensors may be included within the machine. Sensors of this type may be useful in connection with determining the status of various devices of the machine, particularly in connection with a theft situation as later discussed. For example sensor 254 may be useful in providing signals indicative of whether the chest door is open or closed. Likewise sensor 256 may provide signals indicating whether the container holding deposits or other valuable items is in position in the machine or has been removed. Sensor 258 may be operative to provide signals indicating whether cassettes holding cash or other valuable items within the machine have been removed. It should be understood that these sensors are exemplary and in other embodiments numerous types of sensors indicating status, position, actuation or other conditions associated with devices in the machine may be used.

The exemplary machine 220 further includes a wireless transmitter 260. Wireless transmitter 260 is operative responsive to the at least one processor 230 to send signals from the machine. The exemplary machine further includes a wireless receiver 262. The wireless receiver 262 of the exemplary embodiment is operative to receive signals. The wireless receiver 262 is in operative connection with the at least one processor. Of course it should be understood that this arrangement is exemplary.

As schematically represented in FIG. 9 the wireless transmitter and receiver may be operative to communicate wireless signals with one or more remote computers schematically represented 264. The wireless signals may be communicated through a wireless network 266. The wireless network 266 may include for example a cellular network, satellite network or other suitable wireless communication connection for communicating with one or more remote computers. It should be understood that multiple remote computers represented schematically as servers 268 and 270 may be operative to communicate with the wireless transmitter and receiver of the machine. Such servers and computers may be operated for example by persons providing services associated with monitoring the condition of the banking machine. Alternatively or in addition such computers may be operated by persons owning the machine, persons responsible for valuables within the machine or law enforcement personnel. Further as schematically represented in FIG. 9 the computers which wirelessly communicate with the machine may also be operatively interconnected with the network 246 through a suitable server 272 or other interface device. Of course these approaches are exemplary and in other embodiments other approaches may be used.

The exemplary ATM further includes a cash destruction device schematically indicated 274. For purposes of this disclosure the cash destruction device shall be considered as any device that is capable of destroying or rendering unusable valuable items or information included in the ATM. Further it should be understood that cash destruction devices of multiple types may be included within a given automated banking machine.

An exemplary type of cash destruction device shown in FIG. 10 comprises a staining system 276. Staining system 276 comprises a liquid material source of a staining substance such as an ink or other substance which renders valuables such as cash, checks or other items, unusable. The exemplary ink stain system includes a source 278 of such material that in the exemplary embodiment includes a reservoir of pressurized material. An actuator 280 when tripped in response to suitable signals is operative to cause the material from the source to be delivered through hoses 282 or other suitable conduits, to the areas of the valuable items such as cash, checks, mechanisms or other valuables so as to mark such items and render them unusable. Of course this approach is exemplary.

Additionally or alternatively some embodiments may have a cash destruction device which includes a dispenser of odoriferous substances schematically indicated 284. The odoriferous substance dispenser may be in connection with a suitable actuator that operates in response to appropriate signals to cause the substance to be dispensed in the area of valuable items. Such odoriferous substances may be of a type that is highly undesirable and saturates the valuable items included in the banking machine, making them unsuitable for redemption or use. It should be understood that in some embodiments the odoriferous substances may be conducted to various areas through hoses or other conduits in a manner similar to the ink staining substances previously mentioned. Alternatively the odoriferous substances may be of the type that is dispensed generally into an area within the housing of the automated banking machine. The substance may be sufficiently penetrable so as to render the valuable items unsuitable generally due to the confined nature of the material release. Of course these approaches are exemplary and in other embodiments other approaches may be used.

Alternative exemplary devices which may be used as cash destruction devices include a combustion initiator schematically indicated 286. The combustion initiator 286 may include a suitable flammable substance or substances, and an ignitor. The ignitor may operate to release the substances and ignite them in response to suitable signals. The combustion initiator may be operative to provide the material to within the interior area of the chest and cause the destruction of valuable items, mechanisms and information stored within the machine. As a result the combustion may provide suitable flames and/or temperatures to destroy valuable items within the machine so as to prevent a thief from obtaining any benefit therefrom.

In still other embodiments cash destruction devices may include a sheet cutter schematically indicated 288. In the exemplary embodiment the sheet cutter is operative to move to selectively engage cash, currency bills or other items that are moved in a transport within the machine. As a result the sheet cutter may operate to shred certain items within the chest of the banking machine. The shredded items become unsuitable for use by criminals. Of course it should be understood that while blade shredders are schematically represented in FIG. 10, in other embodiments other types of shredding devices, cutters and mechanisms which physically destroy sheet continuity may be used.

Of course cash destruction devices of other or multiple types may be included in exemplary embodiments. These include for example, devices that operate using mechanisms, heat, flame, magnetic radiation, laser emissions or other destructive features.

Exemplary banking machine 220 further includes one or more attack devices schematically indicated 290. Attack devices 290 may have various forms depending on the nature of the automated banking machine and the measures being taken to deter the theft thereof. Exemplary attack devices may include for example, devices which dispense responsive to suitable signals, chemical disabling agents. Such a device is schematically represented 292 in FIG. 10. Chemical dispenser 292 is operative responsive to appropriate signals and the operation of the at least one processor 230 to cause a material that is disabling to humans to be dispensed. This may include for example, materials such as tear gas or pepper spray. Of course in other embodiments other materials may be used.

In other embodiments an attack device may include an electric shock device. Such a device is represented in FIG. 10 by electric shock device 294. Electric shock device 294 may in some embodiments be a device that is actuated responsive to operation of the at least one processor 230. The electric shock device may be operative to cause a shock to a criminal when contacting those areas of the machine that need to be contacted to remove valuable items therefrom. Alternatively or in addition, the electric shock devices may include devices that are operative to shoot electrodes outward from the machine. Such electrodes may be operative to cause a shock to an individual who is standing adjacent to the open chest door of the banking machine. Of course these approaches are exemplary and in other embodiments other approaches may be used.

In still other embodiments attack devices may include sonic output devices that are operative to output sonic signals that cause pain to persons in proximity thereto. This may be done for example, by providing sonic outputs at suitable frequencies and decibel levels so as to provide a painful and/or disabling sensation to individuals in proximity thereto. Such a sonic output device is represented schematically by output device 296 in FIG. 10. Of course these attack devices are exemplary and in other embodiments other types of devices may be used.

In operation of an exemplary embodiment the at least one processor 230 operates to execute the application instructions in data store 232. During normal operation the machine operates responsive to AC power source 238. The at least one processor executes the application instructions to carry out transactions for users through communication with remote computers through the network 246. In the exemplary embodiment the application instructions are executed by the at least one processor 230 to enable the banking machine to carry out transactions as well as other functions that are carried out during the normal course of ATM operation. While the automated banking machine runs in this mode, the battery 242 is charged from the power supply 236. In the exemplary embodiment the exception instructions 234 are executed in a standby mode. Of course it should be understood that in other embodiments exception instructions may be carried out to a greater extent during normal operation of the banking machine.

Figure 11:
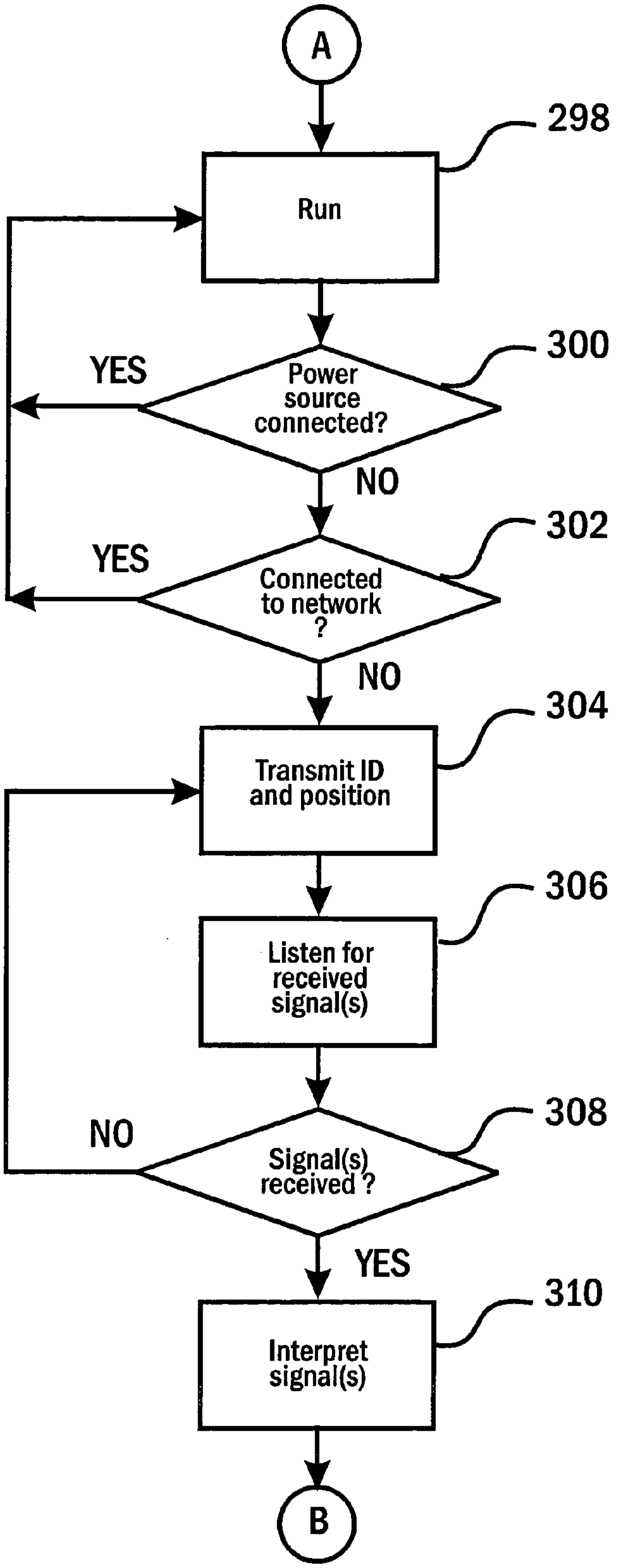
FIGS. 11 and 12 are a schematic representation of an exemplary logic flow carried out through operation of at least one processor in the exemplary machine shown in FIGS. 11 and 12.
Figure 12:
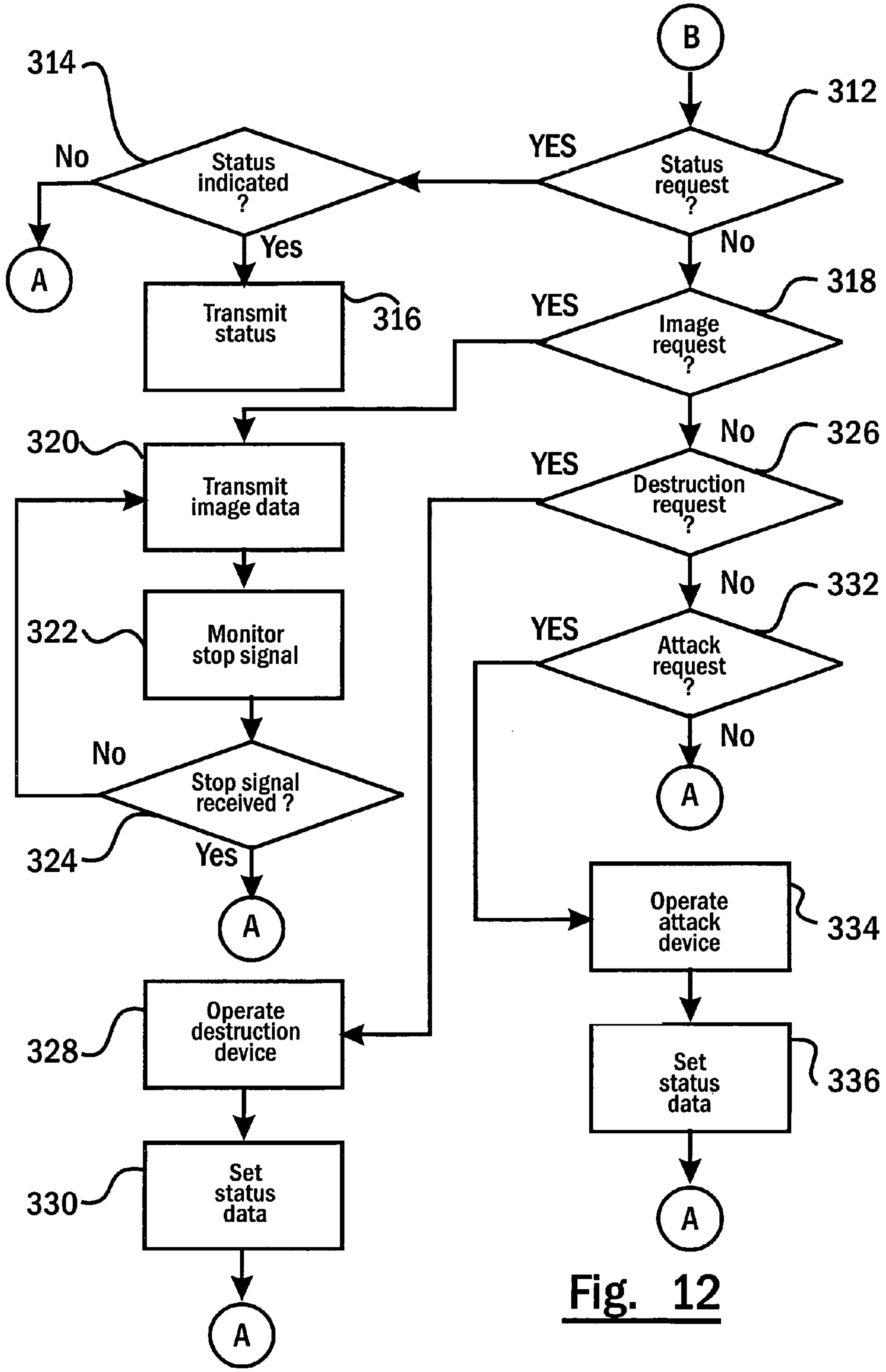

Referring to FIGS. 11 and 12 the exemplary logic executed in response to the exception instructions is schematically represented. The at least one processor 230 executes in a standby mode as represented in a step 298. In the exemplary embodiment the exception instructions are intended for execution in circumstances that correspond to thieves taking the automated banking machine from its original mounting location. This may occur for example in a situation where several thieves sever an ATM from its mounting structures and place it in a vehicle or other device so that it can be taken to a remote location. Generally in the remote location the thieves will work at their leisure to open the chest of the machine to access the cash, checks and other valuable items therein. Of course as can be appreciated, when a machine is taken in this manner its connections to the AC power source as well as to the transaction network will be severed. The exemplary system operates in response to the disconnection of the machine from these two connections to cause the execution of several steps which prevent the thieves from receiving any benefit from their theft activity. It should be understood however that basing the decision to carry out the exception instructions on these two parameters is exemplary. In other embodiments additional parameters or different parameters may be used.

As represented in FIG. 11, the at least one processor operates responsive to the exception instructions to decide whether the banking machine is connected to the power source 238. This is done in a step 300. If the machine remains connected to the power source, then the processor continues to maintain the standby mode with regard to the exception instructions and normal ATM activity occurs. If however in step 300 it is determined that the machine is disconnected from the power source, an inquiry is next made as to whether the machine is still connected in the network 246. This is done at a step 302. This may be done in the manner previously discussed by sending and receiving messages from the network unrelated to transactions. Alternatively it may involve testing for continuity through the network interface or the connector 250. In still other embodiments the determination of whether there is a connection through the connector may be made other ways. If in step 302 it is determined that the machine is still connected to the network then the processor maintains the standby mode with regard to the exception instructions and no further steps are taken in response to the exception instructions.

If however it is determined that the banking machine is disconnected from both its AC power source and network connection, then the at least one processor 230 executes the exception instructions in a manner like that schematically indicated. In the exemplary embodiment the processor 230 operates using the battery power supplied by the battery 242. In the exemplary embodiment, the banking machine outputs at least one wireless signal in a step 304. In the exemplary embodiment the at least one wireless signal includes at least one identifying signal which identifies the particular banking machine. The at least one wireless signal is output through operation of the wireless transmitter 260 responsive to the at least one processor. In the exemplary embodiment the at least one wireless signal also includes a position indicating signal. The position indicating signal is usable to indicate the current location of the banking machine. In an exemplary embodiment the position indicating signal includes a global positioning system (GPS) signal that may be used to determine the then current location of the banking machine.

In alternative embodiments other types of signals may be output in response to determining a condition in which the exception instructions are executed. These additional signals may also indicate other aspects or conditions of the machine. For example the signals may indicate the status of various devices such as the chest door, the status of the various cassettes, the status of other devices or other information about the machine. Alternatively or in addition the determination of an exception condition may cause the output of image data corresponding to images captured by the cameras on the automated banking machine. Of course these approaches are exemplary and in other embodiments other approaches may be used.

In the exemplary embodiment the wireless signals are enabled to be received through the wireless network 266 by one or more computers such as the remote computer 264. In response to programmed instructions and/or user inputs to the computer 264, the exemplary system operates to send a message back to the automated banking machine that is received through operation of the wireless receiver 262. This is represented in a step 306. As represented by a step 308 the exemplary exception instructions operate to cause the at least one processor to continue to transmit the banking machine ID and position data until a signal is received from the appropriate remote computer. Of course it should be understood that these signals may be encrypted or otherwise masked so that they are not readily understood or intercepted by thieves who may then be able to falsely indicate the position for the machine. Of course these approaches are exemplary and in other embodiments other approaches may be used.

Upon receiving signals from the remote computer 264 the at least one processor 230 carries out certain of the exception instructions as necessary to interpret the signals. This is represented in a step 310.

As represented in FIG. 12 the exemplary embodiment operates to carry out certain of the exception instructions responsive to the received wireless signals. These instructions include responses to requests for status information, requests to transfer image data, requests to destroy the contents of the machine and requests to operate attack devices in the machine. Of course it should be understood that these options are exemplary, and in other embodiments other or different requests may be received and instructions carried out. In the exemplary logic flow the at least one processor 230 operates responsive to the exception instructions to determine if the received signals are a status request. This is done as represented in a step 312. It is determined whether one or more statuses are currently indicated in a step 314. If no statuses are indicated, the logic returns to step 298. This is done to determine whether the machine may have been inadvertently temporarily disconnected from its AC power source and the network, for example.

Alternatively, if in step 314 the statuses have been indicated, they are determined and data corresponding thereto is transmitted through the wireless transmitter. This is represented in a step 316. In an exemplary embodiment the statuses transmitted include statuses that reflect the open or closed condition of the chest door. This is done based on sensor 254. Likewise statuses include signals corresponding to the status of cash holding cassettes, deposit holding cassettes or other containers holding valuable items in the machine. In still other embodiments status data may include information that indicates the condition of various cash destruction devices or attack devices in the machine. Of course these statuses are exemplary. Also it should be understood that in other exemplary embodiments statuses may be selectively delivered responsive to wireless signals received through the wireless receiver. In the exemplary embodiment after the appropriate status information is transmitted in a step 316, the logic flow of the exception instructions returns to step 298.

It should be understood that in exemplary embodiments the status of the ATM may also be checked relative to the network by communications through server 272. Thus for example, the at least one remote computer 264 may operate to test whether the automated banking machine is actually connected to the network by causing messages to be sent to the machine to check whether it can be reached through the network. This can be done either directly in some embodiments or by communications through other financial transaction computers that would attempt to operate the machine. In this manner some exemplary embodiments may check whether a malfunction has caused the machine to carry out the exception instructions. Alternatively or in addition, the remote computer 264 may operate in a manner similar to the incorporated disclosure to contact appropriate personnel and notify them about the status of the machine. This may include personnel at the facility where the machine is located. It may also include contacting persons responsible for maintenance of the machine either at the facility which includes the machine, or remotely. Such persons can be contacted to determine whether there is any improper activity occurring at the machine or at the facility where the machine is located. This may help to identify erroneous signals and/or avoid taking action in situations where a disconnection or movement of the machine is being carried out for a legitimate purpose.

Returning to the logic schematically indicated in FIG. 12 when the wireless signal that is received is determined not to be a status request, a determination is made thorough a step 318 as to whether the received wireless signal represents a request to transmit images. If so the at least one processor 230 carries out the exception instructions to cause image data to be transmitted. The image data corresponds to images captured by one or more cameras 52. This is represented by a step 320. The at least one processor operates in accordance with the exception instructions to continue to transmit images until a wireless signal is received to discontinue such transmission. This signal is monitored in a step 322. As indicated in step 324, if the signal indicating that the banking machine should stop transmitting images is received, the logic flow in the exception instructions returns to step 298. Of course as can be appreciated the ability of the exemplary embodiment to transmit image data may enable authorities to remotely capture images regarding the perpetrators of the illegal activity and may also enable remote personnel to control selectively the cash destruction devices and attack devices as appropriate in response to activities being carried out at the machine. Of course these approaches are exemplary.

As represented in FIG. 12 if the at least one wireless signal received by the banking machine through the wireless receiver corresponds to a cash destruction request, this is determined in a step 326. As previously discussed, instructions to operate cash destruction devices may include one or more types of activities that destroy cash as well as other items within the banking machine. In addition in some embodiments where multiple cash destruction devices are present, the exception instructions may provide for the selective operation of such devices responsive to the received wireless signals. In the exemplary embodiment the receipt of a destruction request causes the at least one processor 230 to carry out a portion of the exception instructions which cause operation of the destruction device. This is represented by a step 328. The operation of the destruction device is further indicated through operation of the at least one processor by setting status data to indicate that the particular device has operated. This is represented in a step 330. After the destruction device is operated and the status data set, the logic flow returns to step 298.

In the exemplary embodiment if the received signals correspond to an attack device request this is determined in a step 332. The determination that an attack device operation request has been received causes the execution of some of the exception instructions that cause the attack device to operate. This is represented by a step 334. As can be appreciated, in some embodiments particularly those with multiple attack devices, the received signals may enable the attack devices to be selectively operated in response to received signals. Thus for example the at least one processor 230 may operate in response to signals received from computer 264 to cause the attack devices to deploy at an appropriate time. This might include for example deploying the tear gas or pepper spray shortly after the chest door is sensed as being open. Alternatively and for example, this may include actuating the electric shock device responsive to a currency holding cassette being sensed as being removed from its normal position. The attack devices may be operated in some embodiments responsive to certain programmed sequences including instructions included in the exception instructions. Alternatively or in addition, in some embodiments the attack devices may be operated in response to wireless signals received by the machine in response to manual inputs provided at the remote computer 264. Thus for example in some embodiments the attack devices may be selectively discharged based on conditions sensed at the machine, image data or other information that is available either at the banking machine or at the remote computer. Of course these approaches are exemplary and in other embodiments other approaches may be used.

In the exemplary embodiment after operation of the attack device, the at least one processor 230 operates in response to the exception instructions to cause to be set, status data. This status data is indicative of the actuation of the attack device.

This is represented schematically by a step 336. After execution of the step 336 the logic flow returns to step 298.

It should be understood that this logic flow is schematic and merely exemplary of capabilities that may be carried out by an automated banking machine through operation of the exception instructions. Additional features, functions and other capabilities may be provided in other embodiments.

It should also be understood that the capabilities provided through the exemplary embodiment may also be used for other purposes, including those not related to deterring the theft of an automated banking machine. For example in some embodiments the exception instructions may be operative to enable communications between the at least one processor and remote systems in circumstances where the operating system of the machine is not fully operational. Thus for example, if the machine has sustained a malfunction the exception instructions may include the capability to connect the at least one processor to a remote computer from which a patch and/or a complete new copy of the operating system may be downloaded. Also in other embodiments the exception instructions may be operative to receive repair data, copies of additional applications or other information that can be transmitted even at times while the automated banking machine is not operational.

In still other embodiments the exception instructions may be operative even when the processor is operative, to provide certain functions or to prevent certain activities. This may include for example, having instructions that operate to cause the machine to report on the status of certain devices or conditions at the machine. This may include for example, reporting on the status, type and/or version level of one or more software programs included in the at least one data store 232. This function may enable persons who provide the machine or the software thereon, to determine if the machine has been modified with illegal copies of software, for example. Alternatively or in addition, the exception instructions may monitor the machine to determine if efforts have been made to modify software, encryption keys or other features programmed in the machine in a manner that is improper. In this way the exception instructions may report activity that suggests that potentially criminal activity has occurred with regard to the machine. Of course these approaches are exemplary and in other embodiments other approaches may be used.

In exemplary embodiments the exception instructions may be stored in a nonvolatile memory which is not readily accessed or modified. Thus for example, such exception instructions may be included on the machine in a manufacturing environment and in a way that prevents such instructions from being readily changed in the field. Alternatively or in addition, parameters may be set in a factory environment which provide for limited access to the exception instructions to prevent the execution thereof by unauthorized persons or in unauthorized circumstances. Likewise electronic security mechanisms may be included to prevent unauthorized access or changing of the exception instructions. These approaches enable access to the exception instructions to be highly restricted so as to prevent the improper use and/or modification thereof. Of course these approaches are exemplary and in other embodiments other approaches may be used.

In some embodiments provisions may be made for assuring that attack devices and/or cash destructions devices do not malfunction and operate at inappropriate times. This may be done for example by providing for communication with a remote computer 264 or other computer to disarm the devices. Such messages may be sent in some embodiments via a wireless network or alternatively through the transaction network. Such messages may cause the at least one processor to carry out exception instructions which assure that such attack devices and/or cash destruction devices are not armed and/or have not or will not operate during a time period that the ATM is being accessed by authorized personnel. In exemplary embodiments the status of the machine as being unarmed may be communicated through the service display that can be viewed through the window on the machine. Alternatively such messages may be output through another display or other output device on the machine. Such messages may provide servicers with assurance that they can access the machine without sustaining damage to person or property.

Alternatively or in addition, servicers may be provided with diagnostic devices or other devices that are enabled to communicate with the machine and which cause the exception instructions not to be carried out. These may include for example, devices such as portable phones, RFD cards or other portable devices that communicate with the machine. Such devices may achieve communication through the at least one processor with various transaction devices, and may cause the exception instructions to be executed so as to assure that the cash destruction devices and/or attack devices are not operational. In some exemplary embodiments a portable device used for purposes of disabling such devices may also provide access to diagnostic data or status data of the machine to a servicer. In still other embodiments the machine may be programmed to disable the cash destruction devices and/or attack devices responsive to both the presence of local inputs or an article provided by a servicer, and certain remote signals from a remote source. Of course these approaches are exemplary of approaches that may be used in connection with some embodiments to assure that persons that are authorized to have access to the machines may do so without risk of activities being misunderstood as those of criminals.

Thus embodiments achieve at least some of the above stated objectives, eliminate difficulties encountered in the use of prior devices and systems, solve problems, and attain the desirable results described herein.

In the foregoing description, certain terms have been used for brevity, clarity, and understanding, however, no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means known to those skilled in the art as being capable of performing the recited function, and shall not be deemed limited to the particular means shown in the foregoing description or mere equivalents thereof. The provisions of an Abstract herewith shall not be construed as limiting the claims to features discussed in the Abstract.

Having described the features, discoveries and principles of the invention, the manner in which it is constructed and operated, and the advantages and useful results attained; the new and useful structures, devices, elements, arrangements, parts, combinations, systems, equipment, operations, methods, processes and relationships are set forth in the appended claims.

We claim:

1. Apparatus comprising:

an automated banking machine including:

a display, at least one reader operable to read user data corresponding to financial accounts, a cash dispenser selectively operable to dispense cash from the machine, a wireless transmitter, at least one first memory device comprising at least one transaction data store, wherein the at least one transaction data store includes data corresponding to transaction function instructions related to carrying out a customer transaction, where the at least one first memory device is located in the machine, a second memory device comprising at least one backup data store, wherein the at least one backup data store includes data corresponding to backup instructions related to carrying out at least one backup action, wherein the backup instructions are unrelated to carrying out a customer transaction, where the second memory device is located in the machine at a location which differs from each location of the at least one first memory device, an AC power connector operative to receive power from an AC power source located external to the machine, a machine controller, wherein the controller is in operative connection with the display, the at least one reader, the cash dispenser, the AC power connector, the at least one transaction data store, and the at least one backup data store, wherein the controller includes at least one same computer that is configured to execute both transaction instructions and backup instructions, wherein execution of at least some of the transaction instructions causes operation of at least one of the display, the at least one reader, and the cash dispenser, wherein only when the AC power connector receives power from the AC power source is the controller operable to carry out a customer transaction responsive to execution of at least some of the transaction instructions in the at least one transaction data store, at least one battery operable to supply battery power to the controller responsive to loss of AC power to the machine, wherein operation of the wireless transmitter only occurs when the at least one battery is supplying battery power to the controller, wherein while the AC power connector is disconnected from the AC power source, the controller is unable to access the at least one transaction data store and is unable to carry out a customer transaction, wherein only when at least the AC power connector is disconnected from the AC power source is the controller able to access the at least one backup data store and execute the backup instructions through use of the battery power, wherein the at least one backup action includes activity which is only taken responsive at least in part to loss of AC power to the machine, wherein execution of the backup instructions causes the machine to carry out the activity, wherein the activity includes causing operation of the wireless transmitter to transmit at least one wireless signal, wherein the at least one wireless signal includes both machine identifying data and machine location indicating data.

2. The apparatus according to claim 1 wherein the wireless transmitter comprises a global positioning system (GPS) signal transmitter, wherein the machine location indicating data includes GPS data.

3. Apparatus comprising:

an automated banking machine including:

at least one transaction function device, a wireless transmitter, at least one first data store, wherein the at least one first data store includes transaction instructions, at least one second data store, wherein the at least one second data store includes backup instructions, wherein the backup instructions are unrelated to carrying out a customer transaction, wherein the at least one second data store is without transaction instructions, a machine controller including a machine operating system, wherein the controller is in operative connection with the at least one transaction function device, wherein the controller is operable to access the at least one first data store only when the machine operating system is fully operational, wherein execution of the transaction instructions causes the controller to carry out at least a portion of a customer transaction, wherein carrying out the at least a portion of a customer transaction causes operation of the at least one transaction function device, wherein the controller is operable to access the at least one second data store only when the machine operating system is not fully operational, wherein execution of the backup instructions causes the controller to cause the wireless transmitter to wirelessly send at least one communication to at least one system remotely located from the machine, wherein the at least one communication is unrelated to carrying out a customer transaction, wherein the at least one communication includes both machine identifying data and machine location indicating data, wherein the controller includes at least one computer configured to execute both the transaction instructions and the backup instructions, an AC power connector operative to receive power from an AC power source located external to the machine, wherein the controller is in operative connection with the AC power connector, at least one battery operable to supply battery power to the controller responsive at least in part to loss of AC power to the machine, wherein the controller is configured to automatically switch to battery power responsive at least in part to the machine operating system not being fully operational, wherein responsive at least in part to loss of AC power, the machine operating system is not fully operational.

4. The apparatus according to claim 3 wherein the at least one battery is of sufficient power to allow the controller to carry out the backup instructions, wherein the at least one battery is not of sufficient power to allow the controller to carry out a customer transaction.

5. The apparatus according to claim 3 wherein the at least one transaction function device includes a cash dispenser, a display, and at least one reader of user data, wherein carrying out a customer transaction requires operation of at least one of the cash dispenser, the display, and the at least one reader.

6. The apparatus according to claim 3 wherein the wireless transmitter includes a global positioning system (GPS) signal transmitter, wherein the machine location indicating data includes GPS data.

7. Apparatus comprising:

an automated banking machine including:

at least one transaction function device, a machine controller, at least one transaction data store, wherein the at least one transaction data store includes transaction function instructions related to carrying out at least a portion of a customer transaction, at least one backup data store, wherein the at least one backup data store includes machine backup instructions related to carrying out at least one backup action, wherein the at least one backup action is unrelated to carrying out a customer transaction, where the backup instructions are not included in the at least one transaction data store, at least one battery operable to supply battery power to the controller responsive to loss of AC power to the machine, wherein the controller includes at least one same computer that is configured to access and execute both the transaction function instructions and the machine backup instructions, wherein the controller is operable to access the at least one transaction data store only when the machine is receiving AC power from an AC power source, wherein only when the machine is receiving AC power is the controller operable to execute the transaction function instructions, wherein execution of the transaction function instructions causes operation of the at least one transaction function device, wherein only when the controller is unable to access the at least one transaction data store and the machine is receiving battery power from the at least one battery is the controller able to access the at least one backup data store, wherein only when the machine is receiving battery power is the controller operable to execute the machine backup instructions, wherein execution of the machine backup instructions causes at least one item stored in the machine to be rendered unusable.

8. The apparatus according to claim 7 wherein the at least one item includes cash, and wherein execution of the machine backup instructions causes the cash to be rendered permanently unusable for financial transaction.

9. The apparatus according to claim 7 wherein the at least one item includes customer account data stored in at least one data store in the machine, and wherein execution of the machine backup instructions causes the customer account data to be deleted.

* * * * *